US012750676B2

(12) United States Patent
Song et al.

(10) Patent No.: US 12,750,676 B2
(45) Date of Patent: Sep. 29, 2026

(54) UE OPERATION METHOD RELATED TO MRS OF VRU IN WIRELESS COMMUNICATION SYSTEM

(71) Applicant: LG Electronics Inc., Seoul (KR)

(72) Inventors: Jonghun Song, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 328 days.

(21) Appl. No.: 18/566,419

(22) PCT Filed: Jun. 2, 2022

(86) PCT No.: PCT/KR2022/007852
§ 371 (c)(1),
(2) Date: Dec. 1, 2023

(87) PCT Pub. No.: WO2022/255821
PCT Pub. Date: Dec. 8, 2022

(65) Prior Publication Data

US 2024/0305992 A1 Sep. 12, 2024

(30) Foreign Application Priority Data

Jun. 3, 2021 (KR) ........................ 10-2021-0072296

(51) Int. Cl.
*H04W 4/40* (2018.01)
*H04W 12/069* (2021.01)
*H04W 12/63* (2021.01)

(52) U.S. Cl.
CPC ............. *H04W 12/63* (2021.01); *H04W 4/40* (2018.02); *H04W 12/069* (2021.01)

(58) Field of Classification Search
CPC ..... H04W 12/63; H04W 4/40; H04W 12/069; H04W 12/12; H04W 4/029; H04W 12/65;
(Continued)

(56) References Cited

U.S. PATENT DOCUMENTS 12,126,993 B2 * 10/2024 Whyte .................... H04W 4/38
2019/0068639 A1 * 2/2019 Alexander .............. H04W 4/46
(Continued)

OTHER PUBLICATIONS

Extended European Search Report in European Appln. No. 22816480.2, mailed on Oct. 24, 2024, 7 pages.
(Continued)

*Primary Examiner* — Kenneth T Lam
(74) *Attorney, Agent, or Firm* — Fish & Richardson P.C.

(57) ABSTRACT

An embodiment relates to a method for operating an intelligent transport systems (ITS)-related device related to a vulnerable road user (VRU) in a wireless communication system, the method comprising: receiving, by the ITS-related device, a VRU awareness message (VAM) related report; determining, by the ITS-related device, whether a VAM transmitting and receiving device is malfunctioning, on the basis of the report; and on the basis of determination by the ITS-related device that the VAM transmitting and receiving device is malfunctioning, revoking a certificate of the VAM transmitting and receiving device, wherein the ITS-related device transmits a message for switching a state of the VAM transmitting and receiving device to a temporarily invalid (TI) state on the basis that a detection feature related to VRU information being inconsistent satisfies a predetermined detection evidence level.

8 Claims, 27 Drawing Sheets

(58) Field of Classification Search
CPC .... H04W 4/38; H04W 12/088; G08G 1/0141; G08G 1/093; G08G 1/164; Y02D 30/70
See application file for complete search history.

(56) References Cited

U.S. PATENT DOCUMENTS

| | | | | |
|---|---|---|---|---|
| 2019/0312896 | A1 | 10/2019 | Petit et al. | |
| 2020/0137580 | A1 * | 4/2020 | Yang | H04W 12/122 |
| 2020/0259820 | A1 | 8/2020 | McCall | |
| 2020/0280842 | A1 * | 9/2020 | Liu | H04L 9/3268 |
| 2020/0388156 | A1 | 12/2020 | Aoude et al. | |
| 2021/0067967 | A1 * | 3/2021 | Arzelier | H04L 63/0823 |
| 2021/0144003 | A1 * | 5/2021 | Arzelier | H04L 63/1408 |
| 2021/0160323 | A1 * | 5/2021 | Nassor | G08G 1/093 |
| 2021/0281986 | A1 * | 9/2021 | Zhu | H04W 4/40 |
| 2021/0344513 | A1 * | 11/2021 | Russell | H04W 4/40 |
| 2022/0029832 | A1 * | 1/2022 | Brecht | H04W 12/082 |
| 2022/0232383 | A1 * | 7/2022 | Monteuuis | H04W 12/61 |
| 2024/0323657 | A1 * | 9/2024 | Yang | H04W 4/40 |

OTHER PUBLICATIONS

International Search Report and Written Opinion in International Appln. No. PCT/KR2022/007852, mailed Sep. 21, 2022, 13 pages (with English translation).
Nokia & Nokia Shanghai Bell, "Sidelink evaluation methodology update for power saving," R1-2005499, 3GPP TSG RAN WG1#102-e, e-Meeting, Aug. 17-28, 2020, 6 pages.

* cited by examiner (a)

(b)

(a)

(b)

UE OPERATION METHOD RELATED TO MRS OF VRU IN WIRELESS COMMUNICATION SYSTEM

CROSS-REFERENCE TO RELATED APPLICATIONS

This application is a National Stage application under 35 U.S.C. § 371 of International Application No. PCT/KR2022/007852, filed on Jun. 2, 2022, which claims the benefit of Korean Application No. 10-2021-0072296, filed on Jun. 3, 2021. The disclosures of the prior applications are incorporated by reference in their entirety.

TECHNICAL FIELD

The following description relates to a wireless communication system and, more specifically, to a method and apparatus related to how to process a misbehaviour reporting service (MRS) when the MRS is applied to a vulnerable road user (VRU).

BACKGROUND

Wireless communication systems are being widely deployed to provide various types of communication services such as voice and data. In general, a wireless communication system is a multiple access system capable of supporting communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system, and a multi carrier frequency division multiple access (MC-FDMA) system.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail. 5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

SUMMARY

An object of embodiment(s) is to provide content related to how to process and operate an MRS when the MRS is applied to a VRU.

According to an embodiment, provided herein is an operating method of an intelligent transport systems (ITS)-related apparatus related to a vulnerable road user (VRU) in a wireless communication system, including receiving, by the ITS-related apparatus, a report related to a VRU awareness message (VAM); determining, by the ITS-related apparatus, whether a VAM transceiver is malfunctioning based on the report; and revoking a certificate of the VAM transceiver based on determination that the VAM transceiver is malfunctioning. The ITS-related apparatus transmits a message for switching the VAM transceiver to a temporarily invalid (TI) state based on a detection feature related to inconsistency of VRU information, satisfying a predetermined detection evidence level.

According to an embodiment, provided herein is an intelligent transport systems (ITS)-related apparatus related to a vulnerable road user (VRU) in a wireless communication system, including at least one processor; and at least one computer memory operably connected to the at least one processor and storing instructions that, when executed, cause the at least one processor to perform operations. The operations include receiving a report related to a VRU awareness message (VAM); determining whether a VAM transceiver is malfunctioning based on the report; and revoking a certificate of the VAM transceiver based on determination that the VAM transceiver is malfunctioning. The ITS-related apparatus transmits a message for switching the VAM transceiver to a temporarily invalid (TI) state based on a detection feature related to inconsistency of VRU information, satisfying a predetermined detection evidence level.

According to an embodiment, provided herein is an operating method of a vulnerable road user (VRU) awareness message (VAM) transceiver related to a VRU in a wireless communication system, including transmitting, by the VAM transceiver, a report related to a VAM; and receiving, by the VAM transceiver, information related to revocation of a certificate from an intelligent transport systems (ITS)-related apparatus determining that the VAM transceiver is malfunctioning based on the report. The VAM transceiver is switched to a temporarily invalid (TI) state based on a detection feature related to inconsistency of VRU information, satisfying a predetermined detection evidence level.

According to an embodiment, provided herein is a vulnerable road user (VRU) awareness message (VAM) transceiver related to a VRU in a wireless communication system, including at least one processor; and at least one computer memory operably connected to the at least one processor and storing instructions that, when executed, cause the at least one processor to perform operations. The operations include transmitting a report related to a VAM; and receiving information related to revocation of a certificate from an intelligent transport systems (ITS)-related apparatus determining that the VAM transceiver is malfunctioning based on the report. The VAM transceiver is switched to a temporarily invalid (TI) state based on a detection feature related to inconsistency of VRU information, satisfying a predetermined detection evidence level.

The detection feature related to the inconsistency of the VRU information may include a situation in which the VAM transceiver is located in a dangerous area but a VRU of the VAM transceiver is not adjacent to the VAM transceiver.

In the TI state, transmission of the VAM of the VAM transceiver may be stopped.

In the TI state, the VAM of the VAM transceiver may be excluded from a VRU protection-related procedure of the ITS-related apparatus.

The TI state of the VAM transceiver may be released based on the VAM transceiver leaving the dangerous area and a location of a user of the VAM transceiver being adjacent to the VAM transceiver.

The predetermined detection evidence level may be one of reception of the report, additional reception of the VAM from the same VAM transceiver, reception of the VAM from a neighboring device of the VAM transceiver, reception of the VAM from the neighboring device of the VAM transceiver and reception of sensor information, and reception of the VAM from the neighboring device of the VAM transceiver, reception of the sensor information, and reception of a cooperative perception service (CPS) or a decentralized environmental notification (DENM).

The sensor information may be one or more of information related to inertia, atmospheric pressure, a path, and a location acquired through a sensor included in the VAM transceiver.

In an existing MRS method, if a certificate is revoked, there is disadvantage of requiring time and user intervention for certificate re-issuance etc. even in a normal state. To remove this shortcoming, the present disclosure prevents unnecessary certificate revocation based on a user behavior and intention and performs accurate mode detection and reaction processing (certificate revocation, TI, or other operations) in various environments without user intervention.

BRIEF DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure.

DETAILED DESCRIPTION

In various embodiments of the present disclosure, "/" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
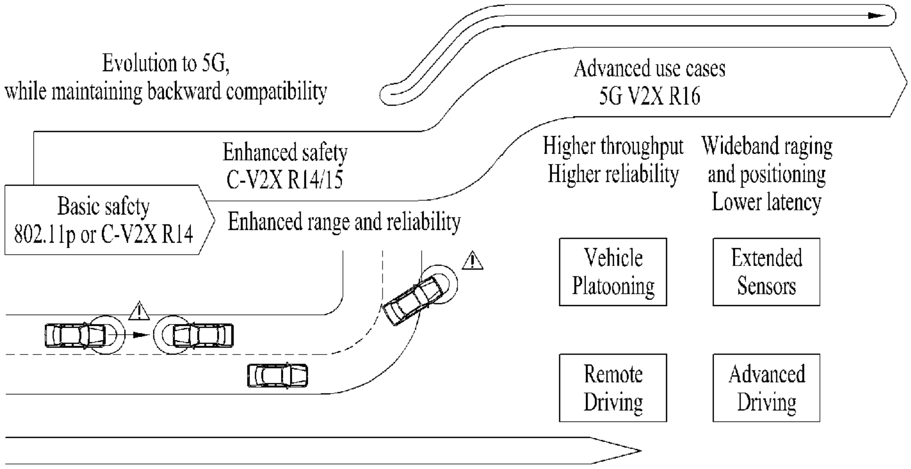
FIG. 1 is a diagram comparing vehicle-to-everything (V2X) communication based on pre-new radio access technology (pre-NR) with V2X communication based on NR.
Figure 2:
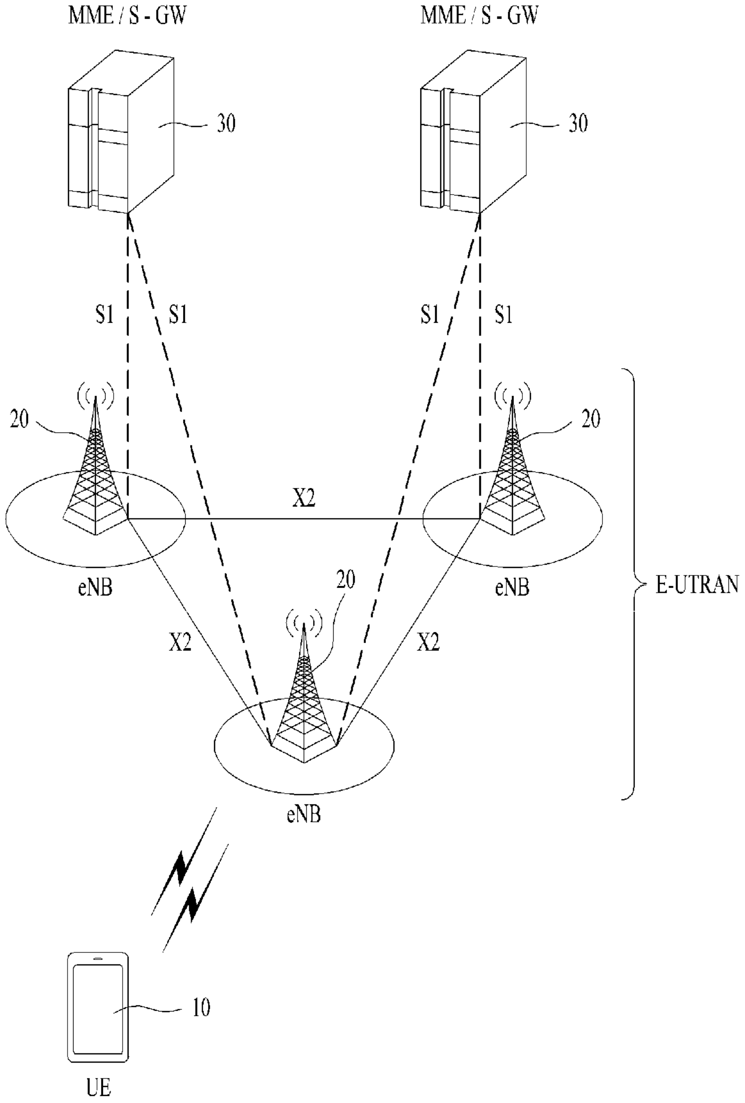
FIG. 2 is a diagram illustrating the structure of a long term evolution (LTE) system according to an embodiment of the present disclosure.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
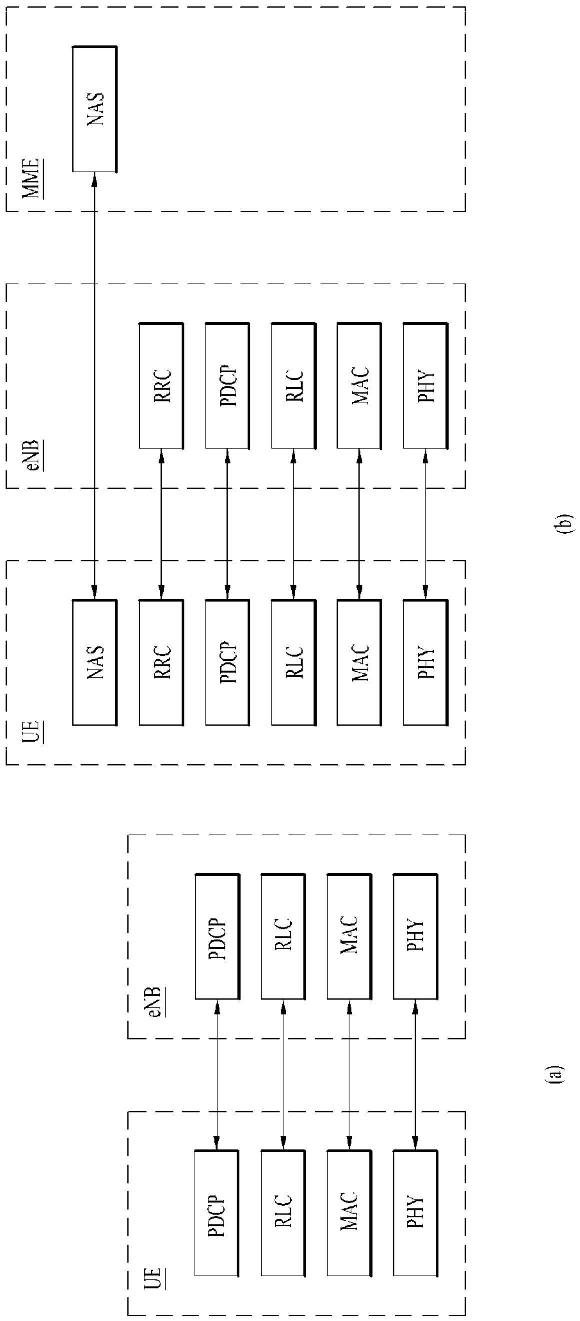
FIG. 3 is a diagram illustrating user-plane and control-plane radio protocol architectures according to an embodiment of the present disclosure.

FIG. 3(*a*) illustrates a user-plane radio protocol architecture according to an embodiment of the disclosure.

FIG. 3(*b*) illustrates a control-plane radio protocol architecture according to an embodiment of the disclosure. A user plane is a protocol stack for user data transmission, and a control plane is a protocol stack for control signal transmission.

Referring to FIGS. 3(*a*) and 3(*b*), the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbol in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 4:
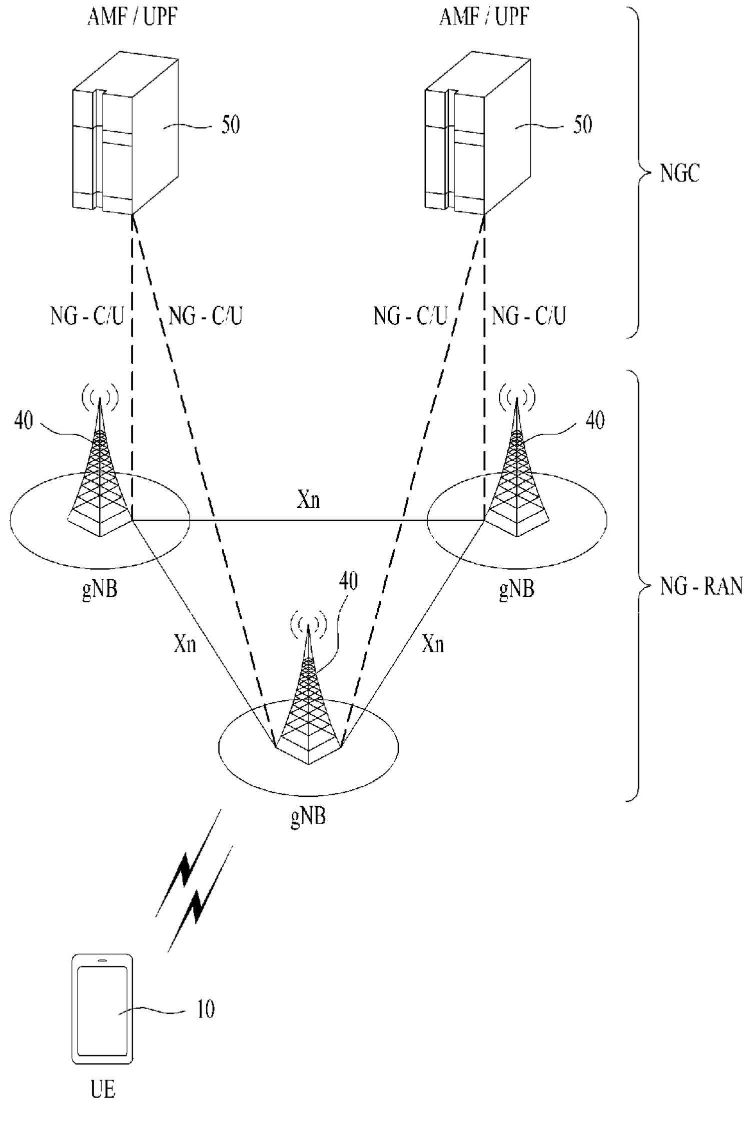
FIG. 4 is a diagram illustrating the structure of an NR system according to an embodiment of the present disclosure.

FIG. 4 illustrates the structure of an NR system according to an embodiment of the present disclosure.

Referring to FIG. 4, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 5:
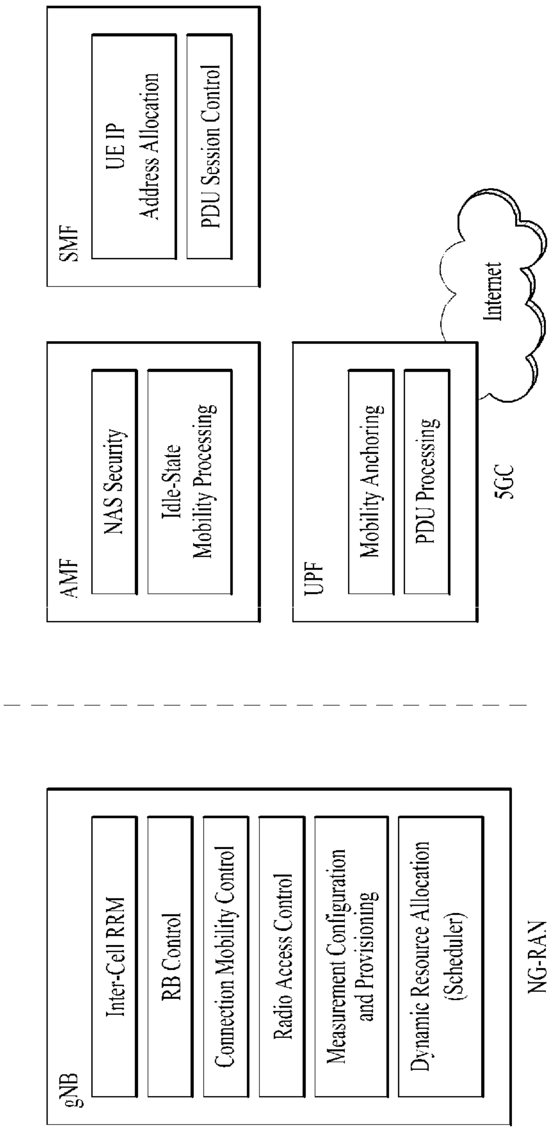
FIG. 5 is a diagram illustrating functional split between a next generation radio access network (NG-RAN) and a 5th generation core network (5GC) according to an embodiment of the present disclosure.

FIG. 5 illustrates functional split between the NG-RAN and the 5GC according to an embodiment of the present disclosure.

Referring to FIG. 5, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 6:
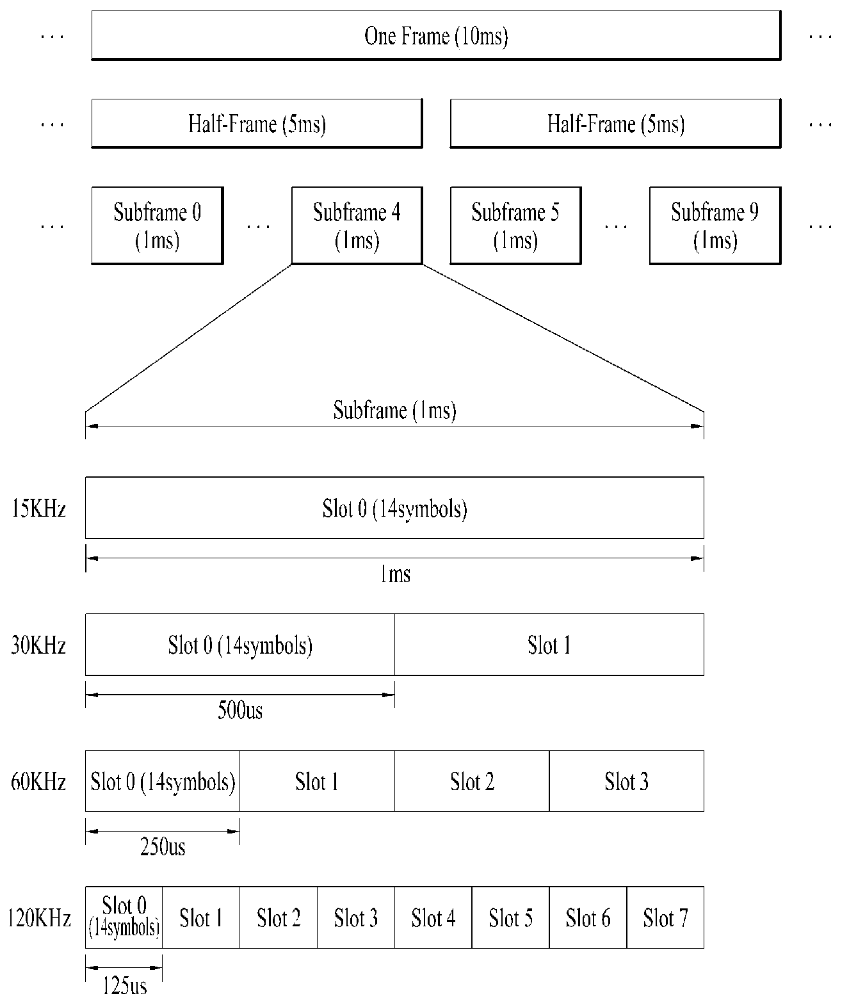
FIG. 6 is a diagram illustrating the structure of an NR radio frame to which embodiment(s) of the present disclosure is applicable.

FIG. 6 illustrates a radio frame structure in NR, to which embodiment(s) of the present disclosure is applicable.

Referring to FIG. 6, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot ($N^{slot}_{symb}$), the number of slots per frame ($N^{frame,u}_{slot}$), and the number of slots per subframe ($N^{subframe,u}_{slot}$) according to an SCS configuration μ in the NCP case.

TABLE 1

| SCS (15*2u) | $N^{slot}_{symb}$ | $N^{frame,u}_{slot}$ | $N^{subframe,u}_{slot}$ |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

Table 2 below lists the number of symbols per slot, the number of slots per frame, and the number of slots per subframe according to an SCS in the ECP case.

TABLE 2

| SCS (15^2u) | $N^{slot}_{symb}$ | $N^{frame,u}_{slot}$ | $N^{subframe,u}_{slot}$ |
|---|---|---|---|
| 60 kHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells.

In NR, various numerologies or SCSs may be supported to support various 5G services. For example, with an SCS of 15 kHz, a wide area in traditional cellular bands may be supported, while with an SCS of 30/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 7:
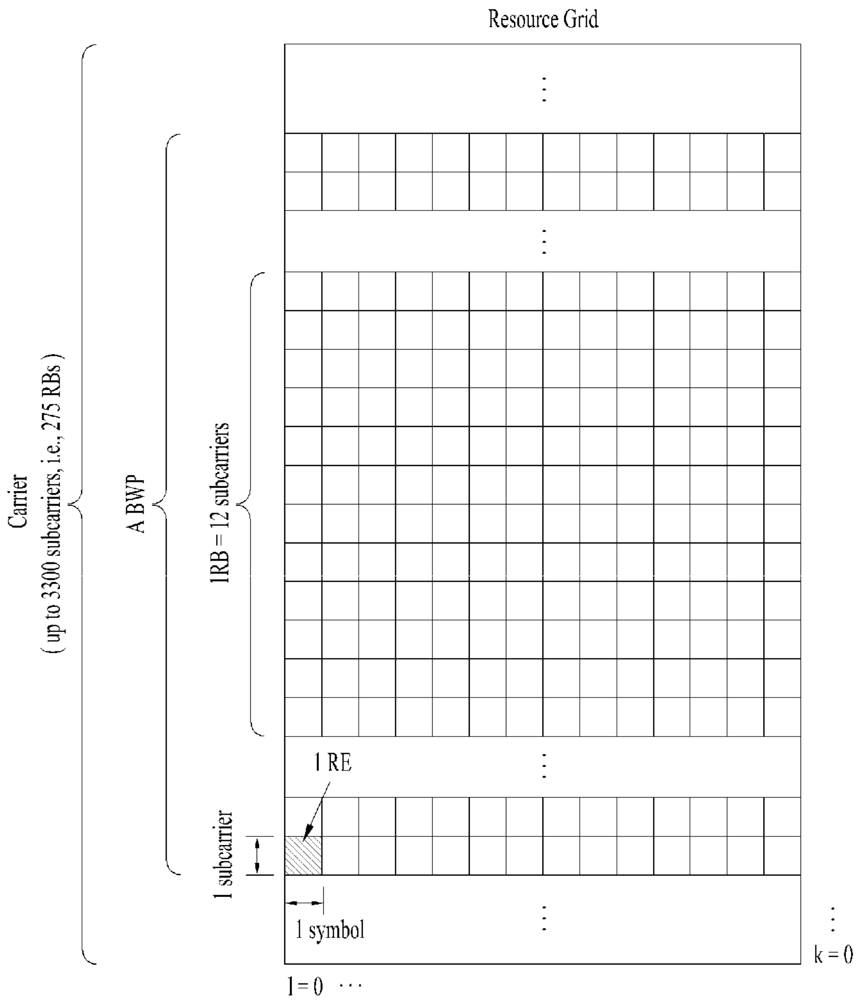
FIG. 7 is a diagram illustrating a slot structure of an NR frame according to an embodiment of the present disclosure.

FIG. 7 illustrates a slot structure in an NR frame according to an embodiment of the present disclosure.

Referring to FIG. 7, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCP layer, or the SDAP layer. For example, L3 may refer to the RRC layer.

Now, a description will be given of sidelink (SL) communication.

Figure 8:
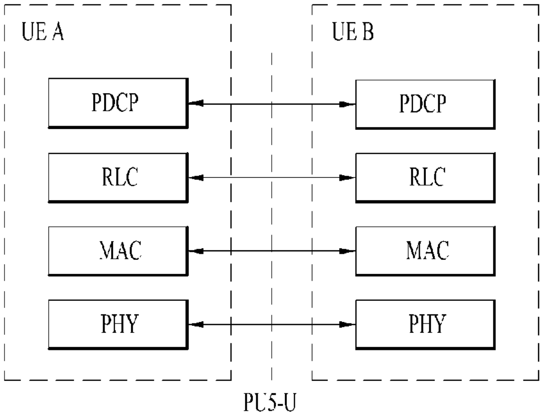
FIG. 8 is a diagram illustrating radio protocol architectures for sidelink (SL) communication according to an embodiment of the present disclosure.
Figure 8:
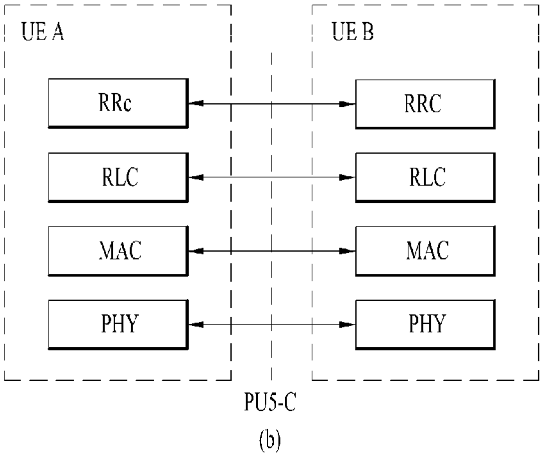

FIG. 8 illustrates a radio protocol architecture for SL communication according to an embodiment of the present disclosure. Specifically, FIG. 8(*a*) illustrates a user-plane protocol stack in LTE, and FIG. 8(*b*) illustrates a control-plane protocol stack in LTE.

Figure 9:
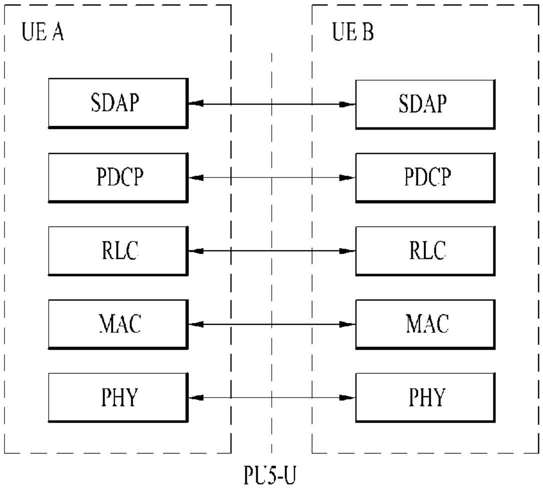
FIG. 9 is a diagram illustrating radio protocol architectures for SL communication according to an embodiment of the present disclosure.
Figure 9:
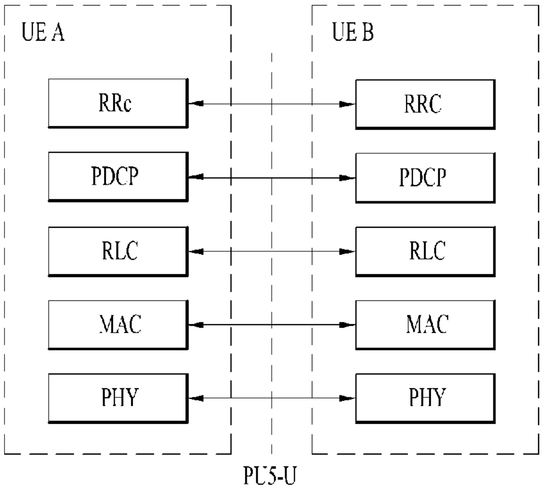

FIG. 9 illustrates a radio protocol architecture for SL communication according to an embodiment of the present disclosure. Specifically, FIG. 9(*a*) illustrates a user-plane protocol stack in NR, and FIG. 9(*b*) illustrates a control-plane protocol stack in NR.

Figure 10:
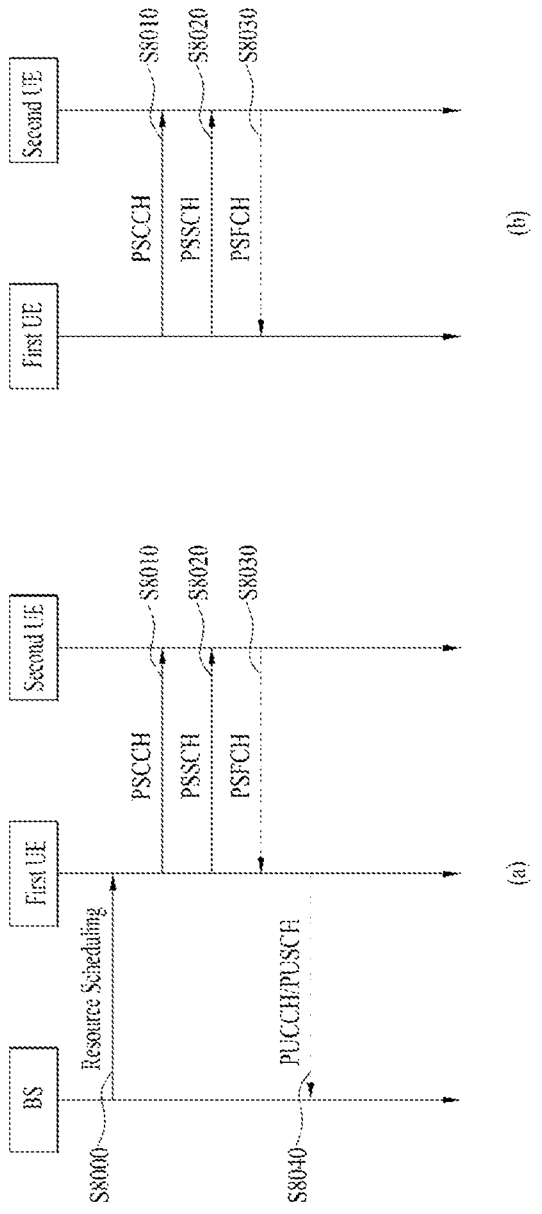
FIG. 10 is a diagram illustrating a procedure for performing V2X or SL communication by a UE according to a transmission mode.

FIG. 10 illustrates a procedure of performing V2X or SL communication by a UE depending on a transmission mode according to an embodiment of the present disclosure. The embodiment of FIG. 10 may be combined with various embodiments of the present disclosure. In various embodiments of the present disclosure, a transmission mode may be referred to as a mode or a resource allocation mode. For the convenience of the following description, a transmission mode in LTE may be referred to as an LTE transmission mode, and a transmission mode in NR may be referred to as an NR resource allocation mode.

For example, FIG. 10(*a*) illustrates a UE operation related to LTE transmission mode 1 or LTE transmission mode 3. Alternatively, for example, FIG. 10(*a*) illustrates a UE operation related to NR resource allocation mode 1. For example, LTE transmission mode 1 may apply to general SL communication, and LTE transmission mode 3 may apply to V2X communication.

For example, FIG. 10 (*b*) illustrates a UE operation related to LTE transmission mode 2 or LTE transmission mode 4. Alternatively, for example, FIG. 10 (*b*) illustrates a UE operation related to NR resource allocation mode 2.

Referring to FIG. 10(*a*), in LTE transmission mode 1, LTE transmission mode 3, or NR resource allocation mode 1, a BS may schedule an SL resource to be used for SL transmission by a UE. For example, in step S8000, the BS may transmit information related to an SL resource and/or information related to a UE resource to a first UE. For example, the UL resource may include a physical uplink control channel (PUCCH) resource and/or a physical uplink shared channel (PUSCH) resource. For example, the UL resource may be a resource to report SL HARQ feedback to the BS.

For example, the first UE may receive information related to a Dynamic Grant (DG) resource and/or information related to a Configured Grant (CG) resource from the BS. For example, the CG resource may include a CG type 1 resource or a CG type 2 resource. In the present specification, the DG resource may be a resource that the BS configures/allocates to the first UE in Downlink Control Information (DCI). In the present specification, the CG resource may be a (periodic) resource configured/allocated by the BS to the first UE in DCI and/or an RRC message. For example, for the CG type 1 resource, the BS may transmit an RRC message including information related to the CG resource to the first UE. For example, for the CG type 2 resource, the BS may transmit an RRC message including information related to the CG resource to the first UE, and the BS may transmit DCI related to activation or release of the CG resource to the first UE.

In step S8010, the first UE may transmit a physical sidelink control channel (PSCCH) (e.g., Sidelink Control Information (SCI) or 1st-stage SCI) to a second UE based on the resource scheduling. In step S8020, the first UE may transmit a physical sidelink shared channel (PSSCH) (e.g., 2nd-stage SCI, MAC PDU, data, etc.) related to the PSCCH to the second UE. In step S8030, the first UE may receive a physical sidelink feedback channel (PSFCH) related to the PSCCH/PSSCH from the second UE. For example, HARQ feedback information (e.g., NACK information or ACK information) may be received from the second UE over the PSFCH. In step S8040, the first UE may transmit/report HARQ feedback information to the BS over a PUCCH or PUSCH. For example, the HARQ feedback information reported to the BS may include information generated by the first UE based on HARQ feedback information received from the second UE. For example, the HARQ feedback information reported to the BS may include information generated by the first UE according to a predetermined rule. For example, the DCI may be DCI for scheduling of SL. For example, the format of the DCI may include DCI format 3_0 or DCI format 3_1. Table 5 shows one example of DCI for scheduling of SL.

TABLE 5

| 7.3.1.4.1 Format 3_0 |
|---|
| DCI format 3_0 is used for scheduling of NR PSCCH and NR PSSCH in one cell.<br>The following information is transmitted by means of the DCI format 3_0 with CRC scrambled by SL-RNTI or SL-CS-RNTI:<br>Resource pool index - $\lceil \log_2 I \rceil$ bits, where I is the number of resource pools for transmission configured by the higher layer parameter sl-TxPoolScheduling.<br>Time gap - 3 bits determined by higher layer parameter sl-DCI-ToSL-Trans, as defined in clause 8.1.2.1 of [6, TS 38.214]<br>HARQ process number - 4 bits.<br>New data indicator - 1 bit.<br>Lowest index of the subchannel allocation to the initial transmission -<br>$\lceil \log_2(N^{NL}_{subChannel}) \rceil$ bits as defined in clause 8.1.2.2 of [6, TS 38.214]<br>SCI format 1-A fields according to clause 8.3.1.1:<br>Frequency resource assignment.<br>Time resource assignment.<br>PSFCH-to-HARQ feedback timing indicator - $\lceil \log_2 N_{fb\_timing} \rceil$ bits, where $N_{fb\_timing}$ is the number of entries in the higher layer parameter sl-PSFCH-ToPUCCH, as defined in clause 16.5 of [5, TS 38.213]<br>PUCCH resource indicator - 3 bits as defined in clause 16.5 of [5, TS 38.213].<br>Configuration index - 0 bit if the UE is not configured to monitor DCI format 3_0 with CRC scrambled by SL-CS-RNTI; otherwise 3 bits as defined in clause 8.1.2 of [6, TS 38.214]. If the UE is configured to monitor DCI format 3_0 with CRC scrambled by SL-CS-RNTI, this field is reserved for DCI format 3_0 with CRC scrambled by SL-RNTI.<br>Counter sidelink assignment index - 2 bits<br>2 bits as defined in clause 16.5.2 of [5, TS 38.213] if the UE is configured with pdsch-HARQ-ACK-Codebook = dynamic<br>2 bits as defined in clause 16.5.1 of [5, TS 38.213] if the UE is configured with pdsch-HARQ-ACK-Codebook = semi-static<br>Padding bits, if required<br>If multiple transmit resource pools are provided in sl-TxPoolScheduling, zeros shall be appended to the DCI format 3_0 until the payload size is equal to the size of a DCI format 3_0 given by a configuration of the transmit resource pool resulting in the largest number of information bits for DCI format 3_0.<br>If the UE is configured to monitor DCI format 3_1 and the number of information bits in DCI format 3_0 is less than the payload of DCI format 3_1, zeros shall be appended to DCI format 3_0 until the payload size equals that of DCI format 3_1. |
| 7.3.1.4.2 Format 3_1 |
| DCI format 3 1 is used for scheduling of LTE PSCCH and LTE PSSCH in one cell.<br>The following information is transmitted by means of the DCI format 3 1 with CRC scrambled by SL Semi-Persistent Scheduling V-RNTI:<br>Timing offset - 3 bits determined by higher layer parameter sl-TimeOffsetEUTRA-List, as defined in clause 16.6 of [5, TS 38.213]<br>Carrier indicator -3 bits as defined in 5.3.3.1.9A of [11, TS 36.212].<br>Lowest index of the subchannel allocation to the initial transmission -<br>$\lceil \log_2(N^{SL}_{subchamel}) \rceil$ bits as defined in 5.3.3.1.9A of [11, TS36.212].<br>Frequency resource location of initial transmission and retransmission, as defined in 5.3.3.1.9A of [11, TS 36.212]<br>Time gap between initial transmission and retransmission, as defined in 5.3.3.1.9A of [11, TS 36.212]<br>SL index - 2 bits as defined in 5.3.3.1.9A of [11, TS 36.212]<br>SL SPS configuration index - 3 bits as defined in clause 5.3.3.1.9A of [11, TS 36.212].<br>Activation/release indication - 1 bit as defined in clause 5.3.3.1.9A of [11, TS 36.212]. |

Referring to FIG. 10(*b*), for LTE transmission mode 2, LTE transmission mode 4, or NR resource allocation mode 2, a UE may determine an SL transmission resource from among SL resources configured by a BS/network or preconfigured SL resources. For example, the configured SL resources or preconfigured SL resources may be a resource pool. For example, the UE may autonomously select or schedule resources for SL transmission. For example, the UE may perform SL communication by selecting a resource by itself within a configured resource pool. For example, the UE may perform sensing and resource (re)selection procedures to select a resource by itself within a selection window. For example, the sensing may be performed in unit of a sub-channel. For example, in step S8010, the first UE having self-selected a resource in the resource pool may transmit a PSCCH (e.g., Sidelink Control Information (SCI) or 1st-stage SCI) to the second UE using the resource. In step S8020, the first UE may transmit a PSSCH (e.g., 2nd-stage SCI, MAC PDU, data, etc.) related to the PSCCH to the second UE. In step S8030, the first UE may receive a PSFCH related to the PSCCH/PSSCH from the second UE.

Referring to FIG. 10(*a*) or FIG. 10(*b*), for example, the first UE may transmit the SCI to the second UE on the PSCCH. Alternatively, for example, the first UE may transmit two consecutive SCIs (e.g., two-stage SCI) to the second UE on the PSCCH and/or PSSCH. In this case, the second UE may decode the two consecutive SCIs (e.g., two-stage SCI) to receive the PSSCH from the first UE. In the present specification, the SCI transmitted on the PSCCH may be referred to as 1st SCI, 1st-stage SCI, or a 1st-stage SCI format, and the SCI transmitted on the PSSCH may be referred to as 2nd SCI, 2nd SCI, or a 2nd-stage SCI format. For example, the 1st-stage SCI format may include SCI format 1-A, and the 2nd-stage SCI format may include SCI format 2-A and/or SCI format 2-B. Table 6 shows one example of a 1st-stage SCI format.

TABLE 6

| |
|---|
| [8.3.1.1 SCI format 1-A] |
| SCI format 1-A is used for the scheduling of PSSCH and 2nd-stage-SCI on PSSCH |

TABLE 6-continued

| |
|---|
| The following information is transmitted by means of the SCI format 1-A: |
| Priority - 3 bits as specified in clause 5.4.3.3 of [12, TS 23.287] and clause 5.22.1.3.1 of [8, TS 38.321]. Value '000' of Priority field corresponds to priority value '1', value '001' of Priority field corresponds to priority value '2', and so on. |
| Frequency resource assignment – $\left\lceil \log_2\left(\frac{N^{SL}_{subChannel}\left(N^{SL}_{subChannel}+1\right)}{2}\right)\right\rceil$ bits when the value of the higher layer parameter sl-MaxNumPerReserve is configured to 2; otherwise $\left\lceil \log_2\left(\frac{N^{SL}_{subChannel}\left(N^{SL}_{subChannel}+1\right)\left(2N^{SL}_{subChannel}+1\right)}{6}\right)\right\rceil$ bits when the value of the higher layer parameter sl-MaxNumPerReserve is configured to 3, as defined in clause 8.1.5 of [6, TS 38.214]. |
| Time resource assignment - 5 bits when the value of the higher layer parameter sl-MaxNumPerReserve is configured to 2; otherwise 9 bits when the value of the higher layer parameter sl-MaxNumPerReserve is configured to 3, as defined in clause 8.1.5 of [6, TS 38.214]. |
| Resource reservation period - $\lceil \log_2 N_{rsv\_period} \rceil$ bits as defined in clause 16.4 of [5, TS 38.213], where $N_{rsv\_period}$ is the number of entries in the higher layer parameter sl-ResourceReservePeriodList, if higher layer parameter sl-MultiReserveResource is configured; 0 bit otherwise. |
| DMRS pattern - $\lceil \log_2 N_{pattern} \rceil$ bits as defined in clause 8.4.1.1.2 of [4, TS 38.211], where $N_{pattern}$ is the number of DMRS patterns configured by higher layer parameter sl-PSSCH-DMRS-TimePatternList. |
| 2nd-stage SCI format - 2 bits as defined in Table 8.3.1.1-1. |
| Beta_offset indicator - 2 bits as provided by higher layer parameter sl-BetaOffsets2ndSCI and Table 8.3.1.1-2. |
| Number of DMRS port - 1 bit as defined in Table 8.3.1.1-3. |
| Modulation and coding scheme - 5 bits as defined in clause 8.1.3 of [6, TS 38.214]. |
| Additional MCS table indicator - as defined in clause 8.1.3.1 of [6, TS 38.214]: 1 bit if one MCS table is configured by higher layer parameter sl-Additional-MCS-Table; 2 bits if two MCS tables are configured by higher layer parameter sl-Additional-MCS-Table; 0 bit otherwise. |
| PSFCH overhead indication - 1 bit as defined clause 8.1.3.2 of [6, TS 38.214] if higher layer parameter sl-PSFCH-Period = 2 or 4; 0 bit otherwise. |
| Reserved - a number of bits as determined by higher layer parameter sl-NumReservedBits, with value set to zero. |

Table 7 shows one example of a 2nd-stage SCI format.

TABLE 7

| |
|---|
| 8.4 Sidelink control information on PSSCH |
| SCI carried on PSSCH is a 2nd-stage SCI. which transports sidelink scheduling information. |
| 8.4.1 2nd-stage SCI formats |
| The fields defined in each of the 2nd-stage SCI formats below are mapped to the information bits $a_0$ to $a_{A-1}$ as follows: |
| Each field is mapped in the order in which it appears in the description. with the first field mapped to the lowest order information bit $a_0$ and each successive field mapped to higher order information bits. The most significant bit of each field is mapped to the lowest order information bit for that field, e.g. the most significant bit of the first field is mapped to $a_0$. |
| 8.4.1.1 SCI format 2-A |
| SCI format 2-A is used for the decoding of PSSCH, with HARQ operation when HARQ-ACK information includes ACK or NACK, when HARQ-ACK information includes only NACK, or when there is no feedback of HARQ-ACK information. |
| The following information is transmitted by means of the SCI format 2-A: |
| - HARQ process number – 4 bits. |
| - New data indicator – 1 bit. |
| - Redundancy version – 2 bits as defined in Table 7.3.1.1.1-2. |
| - Source ID – 8 bits as defined in clause 8.1 of [6, TS 38.214]. |
| - Destination ID – 16 bits as defined in clause 8.1 of [6, TS 38.214]. |
| - HARQ feedback enabled/disabled indicator – 1 bit as defined in clause 16.3 of [5, TS 38.213]. |

TABLE 7-continued

| |
|---|
| - Cast type indicator – 2 bits as defined in Table 8.4.1.1-1 and in clause 8.1 of [6, TS 38.214]. |
| - CSI request – 1 bit as defined in clause 8.2.1 of [6, TS 38.214] and in clause 8.1 of [6, TS 38.214]. |

Referring to FIG. 10(*a*) or FIG. 10(*b*), in step S8030, the first UE may receive the PSFCH based on Table 8. For example, the first UE and the second UE may determine a PSFCH resource based on Table 8, and the second UE may transmit HARQ feedback to the first UE using the PSFCH resource.

TABLE 8

| 16.3 UE procedure for reporting HARQ-ACK on sidelink |
|---|
| A UE can be indicated by an SCI format scheduling a PSSCH reception to transmit a PSFCH with HARQ-ACK information in response to the PSSCH reception. The UE provides HARQ-ACK information that includes ACK or NACK, or only NACK. |
| A UE can be provided, by sl-PSFCH-Period, a number of slots in a resource pool for a period of PSFCH transmission occasion resources. If the number is zero, PSFCH transmissions from the UE in the resource pool are disabled. |
| A UE expects that a slot $t'^{SL}_k (0 \le k < T'_{max})$ has a PSFCH transmission occasion resource if $k \bmod N^{PSFCH}_{PSSCH} = 0$, where $t'^{SL}_k$ is defined in [6, TS 38.214], and $T'_{max}$ is a number of slots that belong to the resource pool within 10240 msec according to [6, TS 38.214], and $N^{PSFCH}_{PSSCH}$ is provided by sl-PSFCH-Period. |
| A UE may be indicated by higher layers to not transmit a PSFCH in response to a PSSCH reception [11, TS 38.321]. |
| If a UE receives a PSSCH in a resource pool and the HARQ feedback enabled/disabled indicator field in an associated SCI format 2-A or a SCI format 2-B has value 1 [5, TS 38.212], the UE provides the HARQ-ACK information in a PSFCH transmission in the resource pool. The UE transmits the PSFCH in a first slot that includes PSFCH resources and is at least a number of slots, provided by sl-MinTimeGapPSFCH, of the resource pool after a last slot of the PSSCH reception. |
| A UE is provided by sl-PSFCH-RB-Set a set of $M^{PSFCH}_{PRB,set}$ PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $N^{PSFCH}_{PSSCH}$, the UE allocates the $[(i + j \cdot N^{PSFCH}_{PSSCH}) \cdot M^{PSFCH}_{subch,slot}, (i + 1 + j \cdot N^{PSFCH}_{PSSCH}) \cdot M^{PSFCH}_{subch,slot} - 1]$ PRBs from the $M^{PSFCH}_{PRB,set}$ PRBs to slot i among the PSSCH slots associated with the PSFCH slot and sub-channel j, where $M^{PSFCH}_{subch,slot} = M^{PSFCH}_{PRB,set}/(N_{sub,ch} \cdot N^{PSFCH}_{PSSCH})$, $0 \le i < N^{PSFCH}_{PSSCH}$, $0 \le j < N_{subch}$, and the allocation starts in an ascending order of i and continues in an ascending order of j. The UE expects that $M^{PSFCH}_{PRB,set}$ is a multiple of $N_{subch} \cdot N^{PSFCH}_{PSSCH}$. |
| The second OFDM symbol l' of PSFCH transmission in a slot is defined as l' = sl-StartSymbol + sl-LengthSymbols – 2. |
| A UE determines a number of PSFCH resources available for multiplexing HARQ-ACK information in a PSFCH transmission as $R^{PSFCH}_{PRB,CS} = N^{PSFCH}_{type} \cdot M^{PSFCH}_{subch,slot} \cdot N^{PSFCH}_{CS}$ where $N^{PSFCH}_{CS}$ is a number of cyclic shift pairs for the resource pool provided by sl-NumMuxCS-Pair and, based on an indication by sl-PSFCH-CandidateResource Type, |
| if sl-PSFCH-CandidateResourceType is configured as startSubCH, $N^{PSFCH}_{type} = 1$ and |

TABLE 8-continued

| 16.3 UE procedure for reporting HARQ-ACK on sidelink |
|---|
| the $M^{PSFCH}_{subch,slot}$ PRBs are associated with the starting sub-channel of the corresponding PSSCH; |
| if sl-PSFCH-CandidateResourceType is configured as allocSubCH, $N^{PSFCH}_{type} = N^{PSSCH}_{subch}$ and the $N^{PSSCH}_{subch} \cdot M^{PSFCH}_{subch,slot}$ PRBs are associated with the $N^{PSSCH}_{sub,ch}$ sub-channels of the corresponding PSSCH. |
| The PSFCH resources are first indexed according to an ascending order of the PRB index, from the $N^{PSFCH}_{type} \cdot M^{PSFCH}_{subch,slot}$ PRBs, and then according to an ascending order of the cyclic shift pair index from the $N^{PSFCH}_{CS}$ cyclic shift pairs. |
| A UE determines an index of a PSFCH resource for a PSFCH transmission in response to a Pssch reception as $(P_{ID} + M_{ID}) \bmod R^{PSFCH}_{PRB,CS}$ where $P_{ID}$ is a physical layer source ID provided by SCI format 2-A or 2-B [5, TS 38.212] scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero. |
| A UE determines a $m_0$ value, for computing a value of cyclic shift α [4, TS 38.211], from a cyclic shift pair index corresponding to a PSFCH resource index and from $N^{PSFCH}_{CS}$ using Table 16.3-1. |

Referring to FIG. 10(*a*), in step S8040, the first UE may transmit SL HARQ feedback to the BS over the PUCCH and/or PUSCH based on Table 9.

TABLE 9

| |
|---|
| 16.5 UE procedure for reporting HARQ-ACK on uplink |
| A UE can be provided PUCCH resources or PUSCH resources [12, TS 38.331] to report HARQ-ACK information that the UE generates based on HARQ-ACK information that the UE obtains from PSFCH receptions, or from absence of PSFCH receptions. The UE reports HARQ-ACK information on the primary cell of the PUCCH group, as described in clause 9, of the cell where the UE monitors PDCCH for detection of DCI format 3_0. |
| For SL configured grant Type 1 or Type 2 PSSCH transmissions by a UE within a time period provided by sl-PeriodCG, the UE generates one HARQ-ACK information bit in response to the PSFCH receptions to multiplex in a PUCCH transmissions occasion that is after a last time<br>resource, in a set of time resources. |
| For PSSCH transmissions scheduled by a DCI format 3_0, a UE generates HARQ-ACK information in response to PSFCH receptions to multiplex in a PUCCH transmission occasion that is after a last time resource in a set of time resources provided by the DCI format 3_0. |
| From a number of PSFCH reception occasions, the UE generates HARQ-ACK information to report in a PUCCH or PUSCH transmission. The UE can be indicated by SCI format to perform one of the following and the UE constructs a HARQ-ACK codeword with HARQ-ACK information, when applicable |
| - for one or more PSFCH reception occasions associated with SCI format 2-A with Cast type indicator field value of "10" |
| - generate HARQ-ACK information with same value as a value of HARQ-ACK information the UE determines from the last PSFCH reception from the number of PSFCH reception occasions corresponding to PSSCH transmissions or, if the UE determines that a PSFCH is not received at the last PSFCH reception occasion and ACK is not received in any of previous PSFCH reception occasions, generate NACK |
| - for one or more PSFCH reception occasions associated with SCI format 2-A with Cast type indicator field value of "01" |
| - generate ACK if the UE determines ACK from at least one PSFCH reception occasion, from the number of PSFCH reception occasions corresponding to PSSCH transmissions, in PSFCH resources corresponding to every identity $M_{ID}$ of the UEs that the UE expects to receive the PSSCH, as described in clause 16.3; otherwise, generate NACK |
| - for one or more PSFCH reception occasions associated with SCI format 2-B or SCI format 2-A with Cast type indicator field value of "11" |

TABLE 9-continued

| |
|---|
| - generate ACK when the UE determines absence of PSFCH reception for the last PSFCH reception occasion from the number of PSFCH reception occasions corresponding to PSSCH transmissions; otherwise, generate NACK |
| After a UE transmits PSSCHs and receives PSFCHs in corresponding PSFCH resource occasions, the priority value of HARQ-ACK information is same as the priority value of the PSSCH transmissions that is associated with the PSFCH reception occasions providing the HARQ-ACK information. |
| The UE generates a NACK when, due to prioritization, as described in clause 16.2.4, the UE does not receive PSFCH in any PSFCH reception occasion associated with a PSSCH transmission in a resource provided by a DCI format 3_0 or, for a configured grant, in a resource provided in a single period and for which the UE is provided a PUCCH resource to report HARQ-ACK information. The priority value of the NACK is same as the priority value of the PSSCH transmissions. |
| The UE generates a NACK when, due to prioritization as described in clause 16.2.4, the UE does not transmit a PSSCH in any of the resources provided by a DCI format 3_0 or, for a configured grant, in any of the resources provided in a single period and for which the UE is provided a PUCCH resource to report HARQ-ACK information. The priority value of the NACK is same as the priority value of the PSSCH that was not transmitted due to prioritization. |
| The UE generates an ACK if the UE does not transmit a PSCCH with a SCI format 1-A scheduling a PSSCH in any of the resources provided by a configured grant in a single period and for which the UE is provided a PUCCH resource to report HARQ-ACK information. The priority value of the ACK is same as the largest priority value among the possible priority values for the configured grant. |

Vulnerable Road User (VRU)

A VRU refers to a road user such as a pedestrian, a bicycle, a motorcycle, etc. According to ETSI TR 103 300-1, the VRU may include users listed in Table 10 below.

TABLE 10

| |
|---|
| Pedestrians (including children, elderly, joggers). |
| Emergency responders, safety workers, road workers. |
| Animals such as horses, dogs down to relevant wild animals (see note below). |
| Wheelchairs users, prams. |
| Skaters, Skateboards, Segway, potentially equipped with an electric engine. |
| Bikes and e-bikes with speed limited to 25 km/h (e-bikes, class L1e-A [i.8]). |
| High speed e-bikes speed higher than 25 km/h, class L1e-B [i.8]. |
| Powered Two Wheelers (PTW), mopeds (scooters), class L1e [i.8]. |
| PTW, motorcycles, class L3e [i.8]; |
| PTW, tricycles, class L2e, L4e and L5e [i.8] limited to 45 km/h; |
| PTW, quadricycles, class L5e and L6e [i.8] limited to 45 km/h. |

Misbehaviour Reporting Service (MRS)

An MRS is a form of excluding a specific node from a V2X system by filtering out a specific certificate item according to an information inconsistency (e.g., the position information of a vehicle is represented as being on a roadway level.

Figure 11:
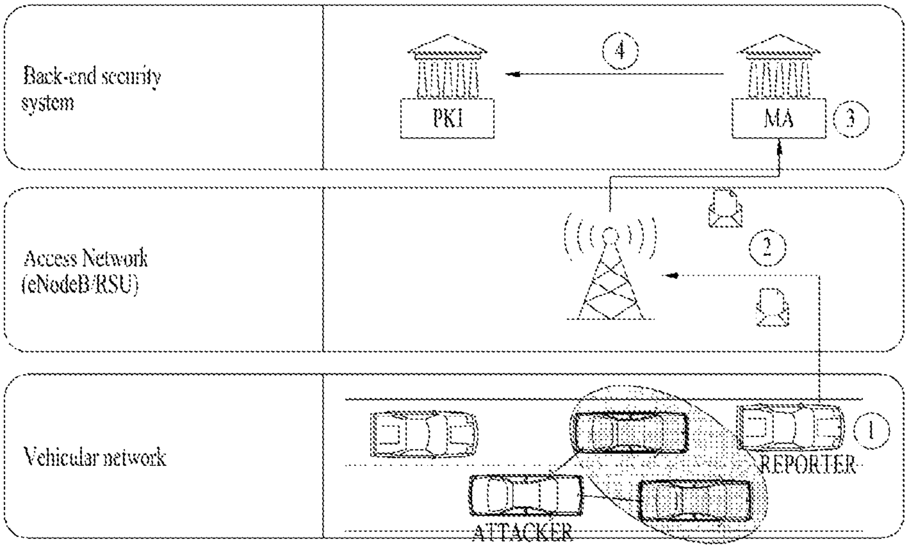
FIGS. 11 to 20 are diagrams for explaining embodiment (s).

An MRS-related processing procedure is carried out in four steps. Referring to FIG. 11, step 1 is local detection, step 2 is reporting, step 3 is global misbehaviour detection, and step 4 is reaction (revocation). In step 1, when a specific vehicle transmits an abnormal message, a nearby vehicle detects an abnormal phenomenon. In step 2, the nearby vehicle that has detected the abnormal phenomenon transmits related information to a misbehaviour authority (MA) server through an eNodeB/road side unit (RSU). In step 3, the MA that has received the related information performs misbehaviour detection (MBD). In step 4, in the case of an abnormal operation or status based on a result of performing MBD, a certificate is revoked and a vehicle that has generated a related message is filtered out from an intelligent transport systems (ITS) network.

In the above description, a false alarm may be divided into two types as shown in Table 11 below. If one type is reduced, the other type increases. Therefore, maintaining an appropriate balance in occurrence of the two types of information may be an important factor in improving the quality of service.

TABLE 11

| False Alarm Type | Description | Result of Occurrence of False Alarm |
|---|---|---|
| False Positive | Reporting an error even though there is no error | Causing customer dissatisfaction, Deteriorating reliability |
| False Negative | Reporting no error even through there is an error | Missing delivery of alarm messages in emergency situations (collision) |

In order to process various ITS messages in an MRS and to process newly defined messages in the future, a framework is configured to insert functions for specific messages. For this purpose, the concept of a detection feature and detection evidence is defined and features to be detected are specified. Accuracy levels are derived by categorizing the levels into five based on the detection evidence in order to determine reliability/accuracy such as possibility.

Table 12 below shows the definition of the detection feature and the detection evidence for a CAM message defined in the MRS.

TABLE 12

| CAM Data | Detection mechanisms for different evidence levels: Level 1 | Level 2 | Level 3 | Level 4 |
|---|---|---|---|---|
| Reference Position | Data unavailable. Confidence too large. Range plausibility. | Position change (PC) too large. PC Incϕ (see note 1) with Speed. PC Incϕ with Heading. | Position not on a road. Position overlap with other vehicles. | Position Incϕ with relative position (Lidar, Radar, RSSI AoA). Position Incϕ with maximum plausible range. |
| Heading | Data unavailable. Confidence too large. | Heading change (HC) too large. RC Incϕ with Speed. HC Incϕ with YawRate | Heading Incϕ with road heading. | Heading Incϕ with relative heading. |
| Speed | Data unavailable. Confidence too large. Speed value too high. | Speed change (SC) too large. SC Incϕ with acceleration. | Speed Incϕ with road plausible speed | Speed Incϕ with relative speed (Doppler). |
| Drive Direction | Data unavailable. | Direction Incϕ with position change & heading. Direction Incϕ with speed. | Direction Incϕ with road way. | Direction Incϕ with perceived direction |
| Vehicle Length/Width | Data unavailable. | Length/width change. | See note 2 | Vehicle length and width Incϕ with perceived dimensions. |
| Longitudinal Acceleration | Data unavailable. Confidence too large. Acceleration value too high. | Acceleration change too large. | — | Acceleration Incϕ with relative acceleration. |
| Curvature | Data unavailable. Confidence too large. Curve radius too small. | Curvature change (CC) too large. CC Incϕ with Speed CC Incϕ with HC CC Incϕ with YawRate | Curvature Incϕ with road shape. | Curvature Incϕ with relative curvature. |
| YawRate | Data unavailable. Confidence too large. YawRate value too high. | YawRate change (YC ) too large. YC Incϕ with Speed YC Incϕ with Curvature | — | YawRate Incϕ with perceived YawRate. |
| | Information related to evidence for different evidence levels | | | |
| Evidence Required | One reported CAM (At least including a full certificate). | Multiple reported CAMs (At least one including a full certificate) | One Reported CAM (With a full certificate). CAMs of neighbours (With a full certificate each). Map of the area (Already available for the MA). | One reported CAM (With a full certificate). Sender's sensor information (data). |
| Evidence Reliability | Total | Total | Partial | Minimal to Partial |

NOTE 1:
Incϕ: inconsistency symbol.
NOTE 2:
"—" means that there is no additional check specified for this level.

Table 12 shows CAM data items (reference position, heading, speed, drive direction, vehicle length/width, longitudinal acceleration, curvature, and yaw rate) available for misbehaviour detection as specified in the ETSJ TR 103 460 draft document. The CAM data items are separately processed according to Level 1 to Level 4.

In the MRS described above, especially, in the case of a VRU (using a smartphone as an example), if the VRU is filtered out without considering user behaviors/intentions, it takes time to return to a normal state (certificate re-issuance), and it is difficult to respond to various inconsistencies of the VRU. In the case of a vehicle, if the vehicle is filtered out, the vehicle is recognized as a vehicle that does not perform an ITS function and the vehicle may return to a normal state by renewing a certificate after certain manipulations (e.g., vehicle repair or other processing). However, in the case of a VRU, if the VRU is filtered out, the VRU is incapable of receiving a VRU protection service until the VRU is restored from a corresponding time point, and the risk of accidents further increases. In addition, the VRU may be exposed to various risk situations (jaywalking, entering the driveway, movement of children in one-lane roads and alleys with roads) even if the VRU is not hacked or malicious. As result, various false alarms and inconsistencies occur frequently and it is difficult to apply the filtering out scheme without change through revocation based on inconsistencies processed in the existing MRS. Moreover, there is a high possibility that the VRU will use a device for various purposes, such as a smartphone, rather than for V2X-only purposes. Since such a device may be easily separated from the VRU in actual use, there may be cases in which the device is incapable of being processed in the existing MRS when the device is designed as a communication device built into or attached to a vehicle.

Accordingly, the present disclosure propose various embodiments related to an MRS optimized for the VRU.

Figure 12:
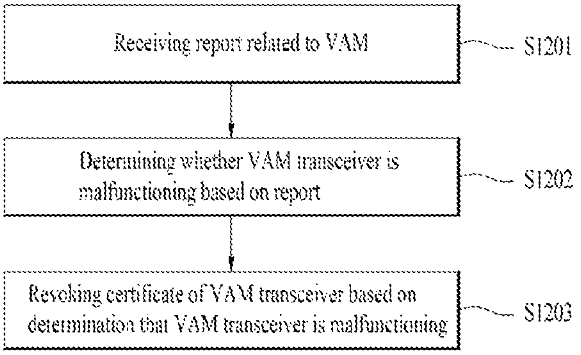

An ITS-related apparatus according to an embodiment may receive a report related to a VRU awareness message (VAM) (S1201 in FIG. 12). The ITS-related apparatus may determine whether a VAM transceiver is malfunctioning based on the report (S1202 in FIG. 12). Based on determination that the VAM transceiver is malfunctioning, the ITS-related apparatus may revoke the certificate of the VAM transceiver (S1201 in FIG. 12).

Here, the ITS-related apparatus may transmit a message for switching the VAM transceiver to a temporarily invalid (TI) state based on a detection feature related to inconsistency of VRU information, satisfying a predetermined detection evidence level. In the TI state, transmission of the VAM (or generation of an ITS message) of the VAM transceiver may be stopped. In addition, in the TI state, the VAM of the VAM transceiver may be excluded from a VRU protection-related procedure of the ITS-related apparatus.

As a specific example, the detection feature related to the inconsistency of the VRU information may include a situation in which the VAM transceiver is located in a dangerous area (specific location) but a VRU of the VAM transceiver is not adjacent to the VAM transceiver. In a general normal situation, if a user in possession of the VAM transceiver is located in a dangerous area, processing should be performed such that a nearby vehicle is normally informed of the dangerous situation of the VRU. However, in Case #2, if the user does not possess the VAM transceiver at that moment (e.g., a situation in which no one is around the VAM transceiver and only the VAM transceiver is placed on the road or a situation in which the VAM transceiver is dropped, thrown, or left), this is processed as a TI state as quickly as possible to inform the nearby vehicle that it is not in a dangerous state. The meaning that the VRU of the VAM transceiver is not adjacent to the VAM transceiver may include the case in which the VRU and the VAM transceiver are separated by more than a (preset or signaled) distance, and the location of the VRU is not known.

Thereafter, if the user possesses the VAM transceiver again, the TI state is changed to a normal mode and generation of the ITS message is normally processed. That is, the TI state of the VAM transceiver may be released, based on a situation in which the VAM transceiver is out of the dangerous area and the location of the user of the VAM transceiver is adjacent to the VAM transceiver.

Whether the VAM transceiver is present at a specific location may be confirmed through a camera of an RSU or a camera of a vehicle around the location or determined through reception of other ITS messages. Whether the VAM transceiver is present at a specific location may also be determined by a nearby VRU, etc.

The predetermined detection evidence level may be one of reception of the report, additional reception of a VAM from the same VAM transceiver, reception of the VAM from a neighboring device of the VAM transceiver, reception of the VAM from the neighboring device of the VAM transceiver and reception of sensor information, and reception of the VAM from the neighboring device of the VAM transceiver, reception of the sensor information, and reception of a cooperative perception service (CPS) (or a DENM). The sensor information may be one or more of information related to inertia, atmospheric pressure, a path, a location, etc., acquired through sensors included in the VAM transceiver. More specifically, the VAM transceiver transmits values obtained through sensors mounted on the VAM transceiver (information such as an inertial measurement unit (IMU) value, an atmospheric pressure value, and a path history, and location information) and uses the values as additional evidence data that may be used for misbehaviour detection. For example, if a person is not holding the VAM transceiver and the VAM transceiver is dropped on the ground, information as to whether the VAM transceiver has been shocked in advance, information as to whether the VAM transceiver is currently moving, or information as to whether the VAM transceiver is on the ground or is located too high compared to the ground, known through estimation of a ground altitude value of a corresponding location by combining altitude information and location information using an IMU position or a barometer value at a corresponding time, since the front or back of the VAM transceiver is facing the ground on which the VAM transceiver is located when the VAM transceiver is on the ground may be used for decision evidence of misbehaviour detection of the VAM transceiver.

The detection feature and the detection evidence may be as shown in Tables 13 and 14 below.

TABLE 13

| Detection Feature | Description |
|---|---|
| VRU Position inconsistent | Inconsistency in a VRU position. For example, when the VRU is within roadway in pedestrian mode<br>When the position of the VRU is on a roadway but the altitude of the roadway is high and is not close to the ground |
| VRU direction inconsistent | When the direction of a VRU is into water instead of a sidewalk or roadway, or the VRU moves in the middle of a roadway. |
| VRU cluster inconsistent | When information of a VRU belonging to a cluster, that should be the same as that of other VRUs in the cluster, is different (e.g., position etc.) |
| VRU (pedestrian)-Phone inconsistent | When a VRU (pedestrian) does not carry a phone (VAM transceiver) and drops the phone or leaves the phone on the roadway, so surrounding vehicles should ignore the VAM transceiver. |
| VAM message inconsistent | When inconsistency occurs in a VAM message |
| VAM path history inconsistent | When inconsistency occurs as a result of analyzing the path history of the VRU |

TABLE 14

| Detection evidence level | Description |
|---|---|
| Level 1 | Only basic evidence |
| Level 2 | Additional VAM (subsequent to the one used for basic evidence) from same sender |
| Level 3 | VAM of neighbors |
| Level 4 | Level 3 + at least one of relevant info, sensor info, RF info |
| Level 5 | Level 4 + at least one of CPS(Cooperative Perception Service), DENM(Decentralized Environmental Notification Message) |

The above-described embodiment of FIG. 12 may be appreciated as corresponding to the case in which the detection feature is "VRU (pedestrian)—Phone inconsistent" and the detection evidence level is Level 1 (report received). Apparently, in the embodiment of FIG. 12, the detection evidence level may be one of Levels 2 to 5. For example, in the embodiment of FIG. 12, the detection feature may be "VRU (pedestrian)—Phone inconsistent" and the detection evidence level may be Level 4, so that TI may be determined using sensor information as well after receiving a report.

Table 15 below shows each case including the above embodiment. In Case #2, it may be appreciated that TI corresponds to the above description. In Case #1, if a signal is generated and continuously detected in the vicinity although it is confirmed that there is no VAM transceiver at a specific location and there is no person at that location, it is considered that another device of an abnormal state generates a message of incorrect information, and a certificate registered in that message is revoked.

TABLE 15

| | Presence of VAM transceiver at specific location (a) | Presence of person/user/VRU where VAM transceiver is located | Detection of signal by other nodes due to generation of signal | Operation analysis | Final processing method |
|---|---|---|---|---|---|
| Case #1 | X | X | ○ | Specific device transmits incorrect message | Revocation |
| Case #2 | ○ | X | ○ | Context needs to be analyzed and processed although VAM transceiver is normally operating | Revocation or TI |

In the above description, the ITS-related apparatus may be one of an ITS server and an RSU. According to the above-described embodiment, in an abnormal situation in which a phone (hereinafter, VAM transceiver) is placed on the roadway or there is a VAM transceiver but there is no person/user in the immediate vicinity of the VAM transceiver, the VAM transceiver enters a TI state in consideration of various user behaviors/intensions of the VRU. Therefore, if a false alarm (false positive or false negative) is removed and the VAM transceiver enters a normal state again by the user (e.g., if the user takes the VAM transceiver again and holds the VAM transceiver in a hand or in a bag), the TI state of the VAM transceiver returns to the normal state to generate an ITS message as usual.

Thereby, as compared with an existing MRS method in which, if a certificate is revoked, time and user intervention for certificate re-issuance etc. are required even in a normal state, the TI state is added to a state machine and, in some cases, states are changed between TI and normal mode, so that unnecessary certificate revocation is prevented based on a user behavior and intention and accurate mode detection and reaction processing (certificate revocation, TI, or other operations) in various environments are performed without user intervention.

Figure 13:
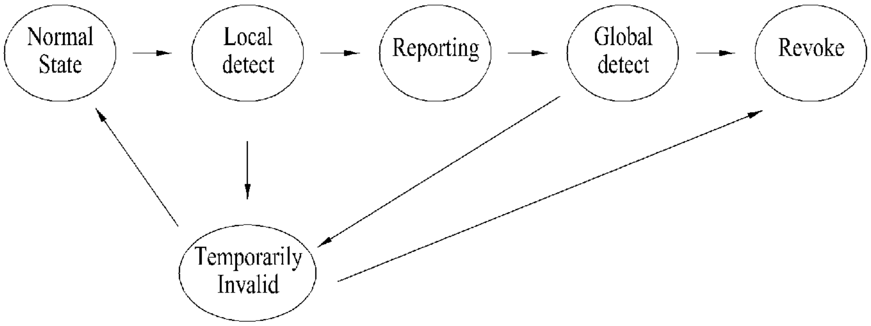

FIG. 13 illustrates a state machine to which a TI state is added. A local detection or global detection state may switch to the TI state. Next, if a VAM transceiver operates normally, the TI state switches to a normal state (same as an initial state operating normally). If the TI state continues, the state is processed as a revocation state after a certain period of time (e.g., 5 minutes). To process the TI state, an RSU, near a VRU, or a V2X application server (AS) may perform a misbehaviour detection function.

Figure 14:
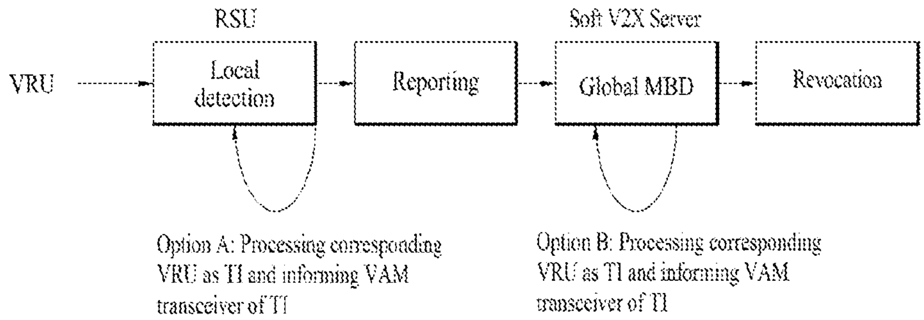

FIG. 14 illustrates a flow processed by an RSU, near a VRU, or an AS. Information generated by the VRU may be detected by the RSU near the VRU or by another VRU, and the RSU or the VRU may inform the server of the generated information. In Option A, the RSU performs TI processing and, in Option B, the AS that has received a report of the RSU performs TI processing.

Figure 15:
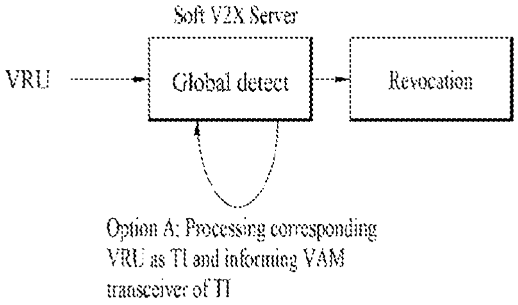

FIG. 15 illustrates processing of a misbehavior detection function performed by a V2X AS. In relation to this processing, a VAM transceiver may perform reporting to the V2X AS through a separate path.

Figure 16:
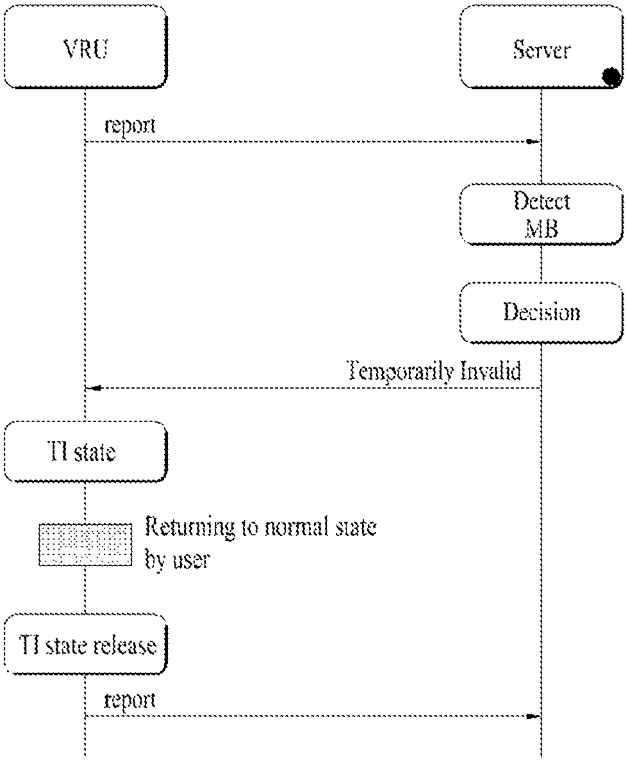

In FIG. 16, a server performs misbehavior detection and forces a VAM transceiver to enter a TI state based on decision to prevent a false alarm from occurring around the VAM transceiver. Thereafter, if the VAM transceiver returns to a normal state by a user (e.g., if the user picks up the VAM transceiver and comes to a sidewalk, an operating status of the user is determined using IMU information and map information), the TI state is released and reporting to the server is performed to release abnormal state information detected by the server.

Figure 17:
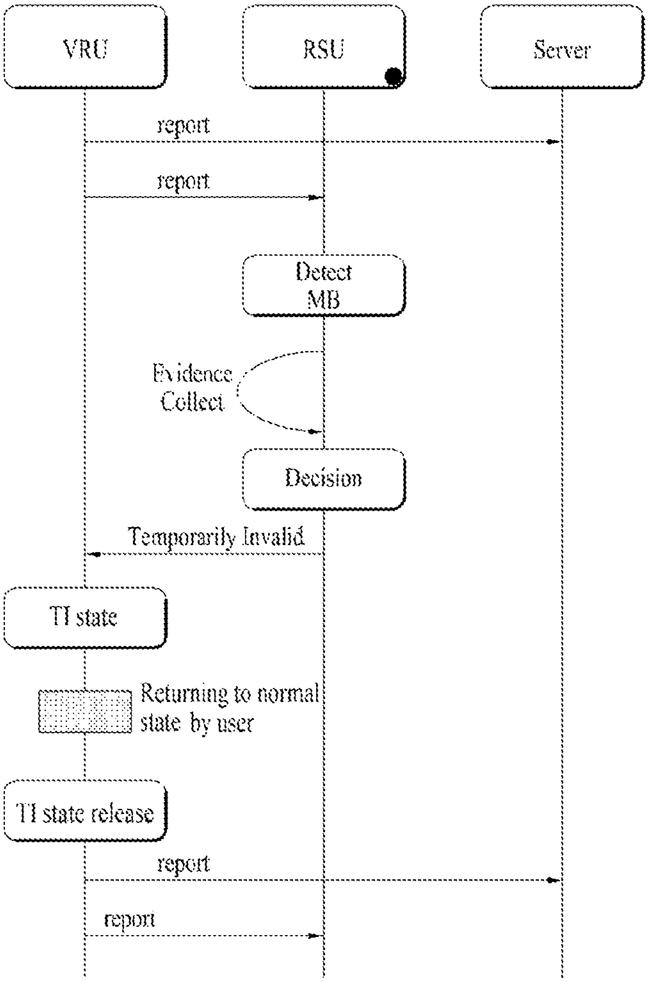

In FIG. 17, an RSU performs misbehavior detection and forces a VAM transceiver to enter a TI state based on decision to prevent a false alarm from occurring around the VAM transceiver. Thereafter, if the VAM transceiver returns to a normal state by a user (e.g., if the user picks up the VAM transceiver and comes to a sidewalk, an operating status of the user is determined using IMU information and map information), the TI state is released and reporting to the RSU is performed to release abnormal state information detected by a server. Additionally, the server makes a request to the VAM transceiver in the form of "an abnormal state has been detected, so if it is normal, please give user confirmation". If the server confirms that there is a person as a result of obtaining video information of a corresponding position through the RSU, the server may release the TI state.

Figure 18:
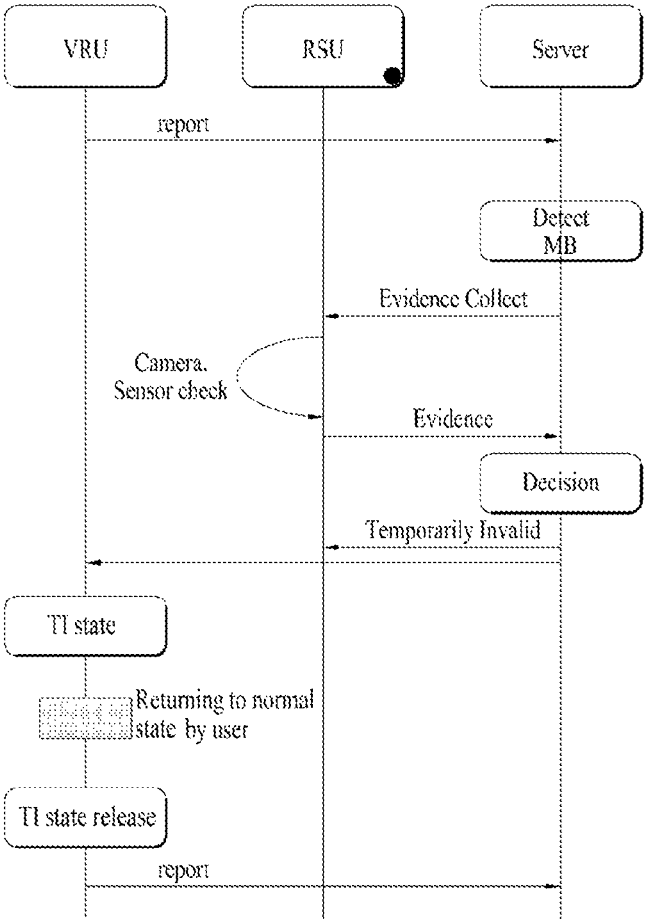

In FIG. 18, a server performs misbehavior detection and makes a request for information collection to an RSU around a corresponding VRU in order to further confirm information. If the RSU reports information obtained through cameras or sensors to the server, the server collects related information and makes a decision. If a VAM transceiver is in an abnormal state, the server forces the VAM transceiver to enter a TI state to prevent a false alarm from occurring around the VAM transceiver. Thereafter, if the VAM transceiver returns to a normal state by the user, the TI state is released and reporting to the RSU and the server is performed to release abnormal state information detected by the server.

Figure 19:
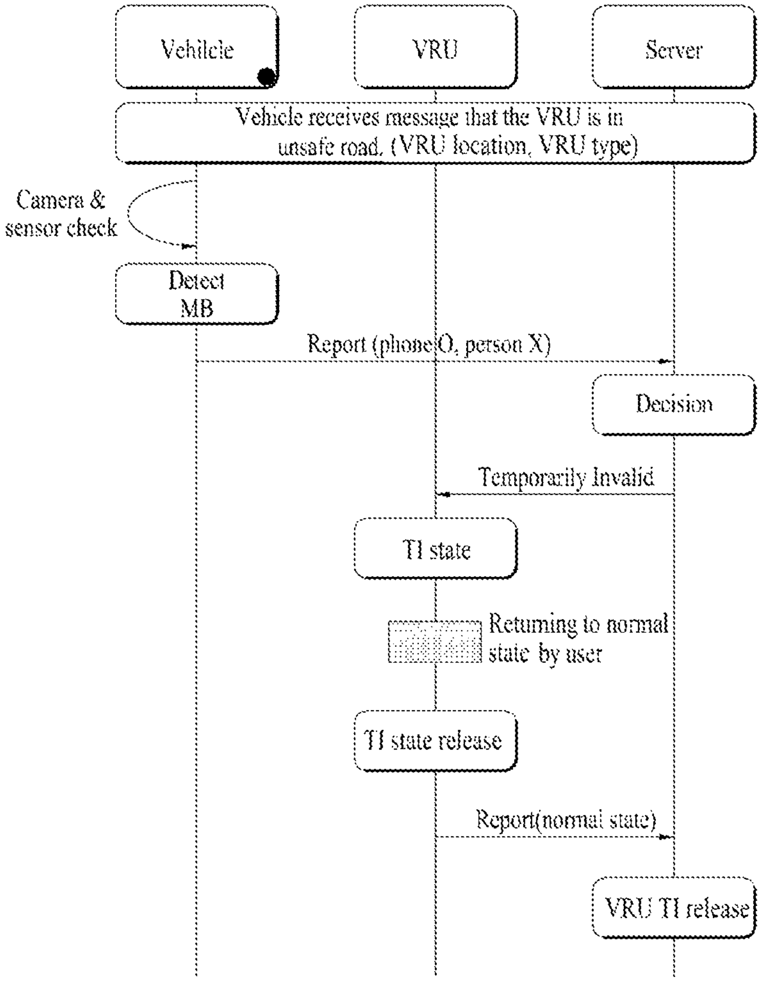

In FIG. 19, a nearby vehicle detects an abnormal state of a VRU and reports this situation to a server. The server performs misbehavior detection based on transmitted data and forces a VAM transceiver to enter a TI state based on decision to prevent a false alarm from occurring around the VAM transceiver. Thereafter, if the VAM transceiver returns to a normal state by the user, the TI state is released and reporting to an RSU is performed to release abnormal state information detected by the server.

Figure 20:
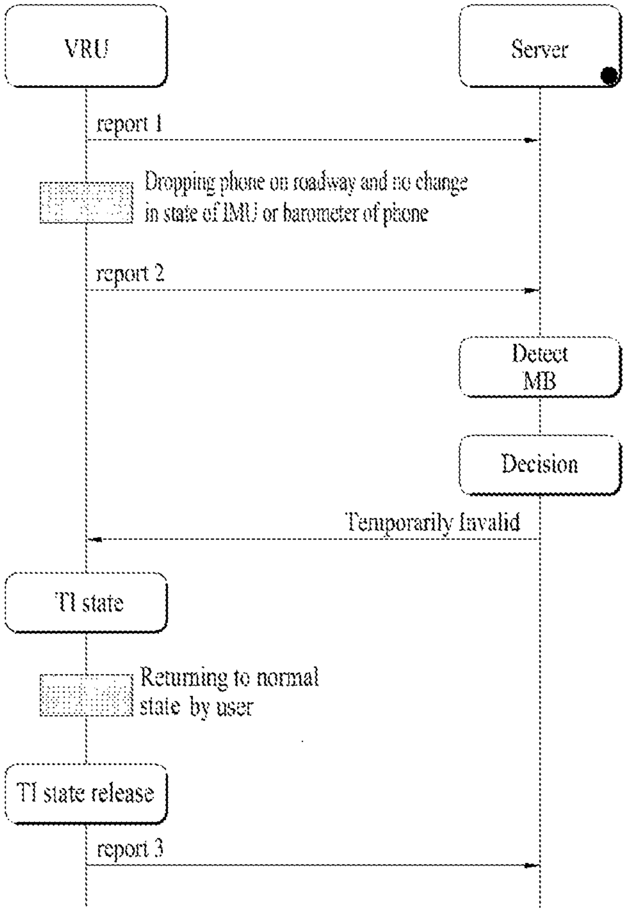

FIG. 20 illustrates that misbehavior detection is performed by a server after a certain period of time (e.g., 30 seconds) has passed in a state in which a pedestrian drops a VAM transceiver on the roadway without being recognized. The server detects "VRU (pedestrian)—Phone inconsistent" as a detection feature, calculates an evidence level using data transmitted by nearby RSUs, nearby vehicles, etc. at times close to a corresponding time, and makes a decision, thereby preventing a false alarm from occurring by switching the VAM transceiver to a TI state. Specified concepts #17 to #19 may be applied before this scenario is performed.

In relation to the above description, an ITS-related apparatus includes at least one processor; and at least one computer memory operably connected to the at least one processor and storing instructions that, when executed, cause the at least one processor to perform operations. The operations may include receiving a report related to a VRU awareness message (VAM); determining whether a VAM transceiver is malfunctioning based on the report; and revoking a certificate of the VAM transceiver based on determination that the VAM transceiver is malfunctioning. The ITS-related apparatus transmits a message for switching the VAM transceiver to a TI state based on a detection feature related to inconsistency of VRU information, satisfying a predetermined detection evidence level.

An operating method of a VAM transceiver includes transmitting, by the VAM transceiver, a report related to a VAM; and receiving, by the VAM transceiver, information related to revocation of a certificate from an ITS-related apparatus determining that the VAM transceiver is malfunctioning based on the report. The VAM transceiver may be switched to a TI state based on a detection feature related to inconsistency of VRU information, satisfying a predetermined detection evidence level.

A VAM transceiver includes at least one processor; and at least one computer memory operably connected to the at least one processor and storing instructions that, when executed, cause the at least one processor to perform operations. The operations may include transmitting a report related to a VAM; and receiving information related to revocation of a certificate from an ITS-related apparatus determining that the VAM transceiver is malfunctioning based on the report. The VAM transceiver may be switched to a TI state based on a detection feature related to inconsistency of VRU information, satisfying a predetermined detection evidence level.

Examples of Communication Systems Applicable to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 21:
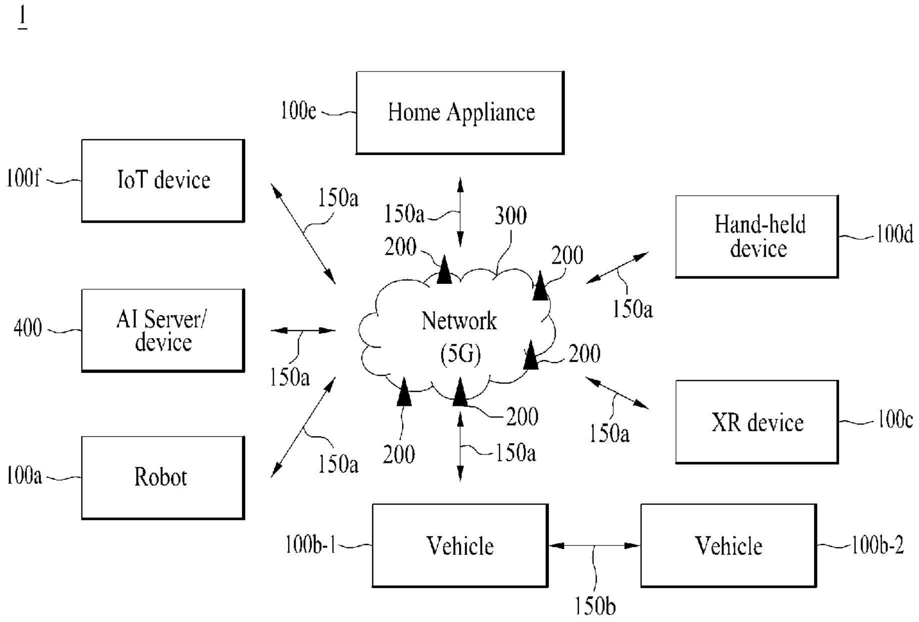
FIGS. 21 to 27 are diagrams for explaining various devices to which embodiment(s) are applicable.

FIG. 21 illustrates a communication system 1 applied to the present disclosure.

Referring to FIG. 21, a communication system 1 applied to the present disclosure includes wireless devices, BSs, and a network. Herein, the wireless devices represent devices performing communication using RAT (e.g., 5G NR or LTE) and may be referred to as communication/radio/5G devices. The wireless devices may include, without being limited to, a robot 100*a*, vehicles 100*b*-1 and 100*b*-2, an extended reality (XR) device 100*c*, a hand-held device 100*d*, a home appliance 100*e*, an Internet of things (IoT) device 100*f*, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. V2V/V2X communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as UL/DL communication 150*a*, sidelink communication 150*b* (or, D2D communication), or inter BS communication (e.g. relay, integrated access backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices Applicable to the Present Disclosure

Figure 22:
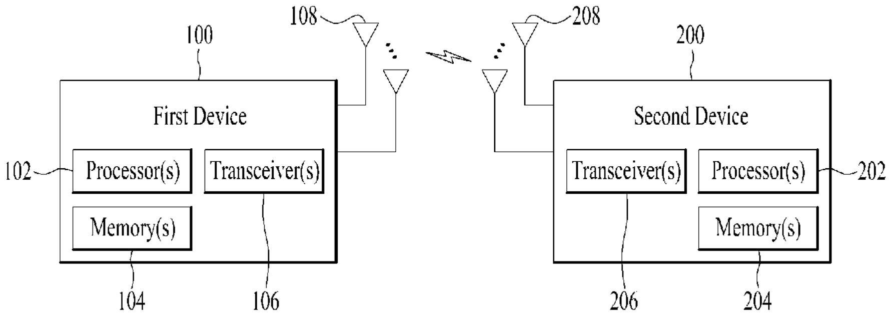

FIG. 22 illustrates wireless devices applicable to the present disclosure.

Referring to FIG. 22, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 21.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 23:
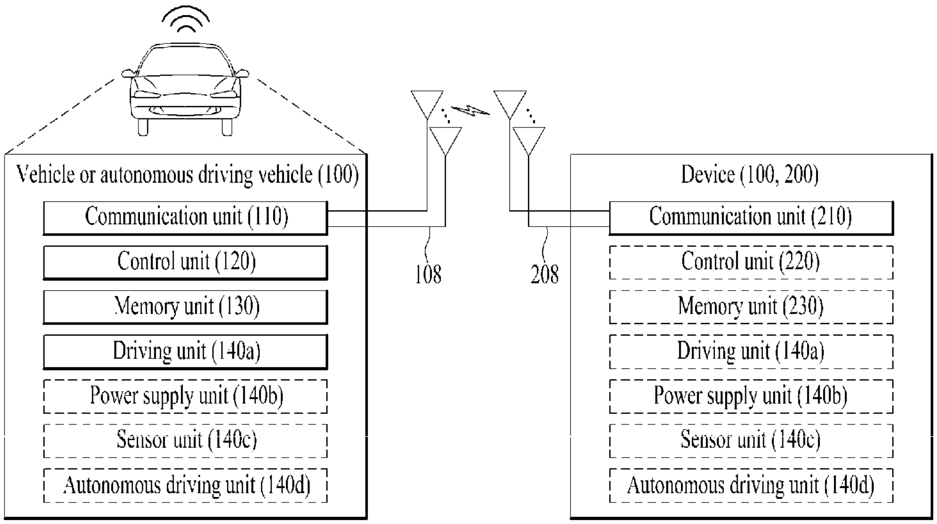

Examples of a Vehicle or an Autonomous Driving Vehicle Applicable to the Present Disclosure FIG. 23 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 23, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of a Vehicle and AR/VR Applicable to the Present Disclosure

Figure 24:
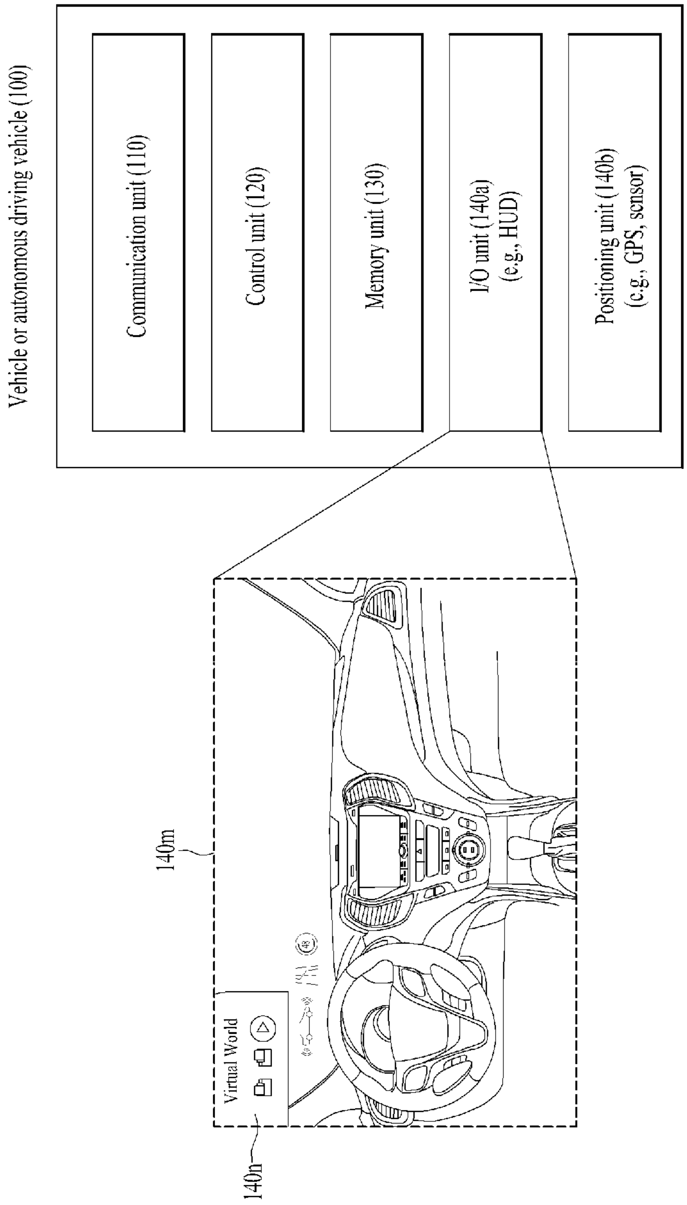

FIG. 24 illustrates a vehicle applied to the present disclosure. The vehicle may be implemented as a transport means, an aerial vehicle, a ship, etc.

Referring to FIG. 24, a vehicle 100 may include a communication unit 110, a control unit 120, a memory unit 130, an I/O unit 140*a*, and a positioning unit 140*b*.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140*a* may output an AR/VR object based on information within the memory unit 130. The I/O unit 140*a* may include an HUD. The positioning unit 140*b* may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140*b* may include a GPS and various sensors.

As an example, the communication unit 110 of the vehicle 100 may receive map information and traffic information from an external server and store the received information in the memory unit 130. The positioning unit 140*b* may obtain the vehicle position information through the GPS and various sensors and store the obtained information in the memory unit 130. The control unit 120 may generate a virtual object based on the map information, traffic information, and vehicle position information and the I/O unit 140*a* may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140*a*. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Examples of an XR Device Applicable to the Present Disclosure

Figure 25:
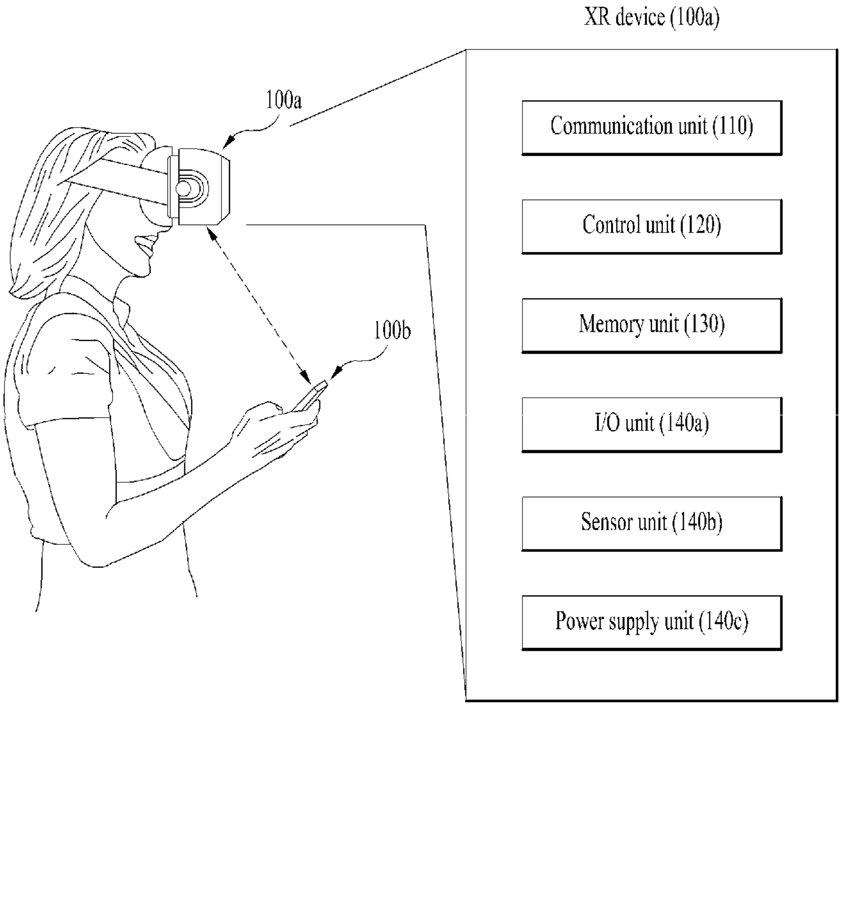

FIG. 25 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 25, an XR device 100*a* may include a communication unit 110, a control unit 120, a memory unit 130, an I/O unit 140*a*, a sensor unit 140*b*, and a power supply unit 140*c*.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100*a*. For example, the control unit 120 may be configured to control and/or perform procedures such as video/image acquisition, (video/image) encoding, and metadata generation and processing. The memory unit 130 may store data/parameters/programs/code/commands needed to drive the XR device 100*a*/generate XR object. The I/O unit 140*a* may obtain control information and data from the exterior and output the generated XR object. The I/O unit 140*a* may include a camera, a microphone, a user input unit, a display unit, a speaker, and/or a haptic module. The sensor unit 140*b* may obtain an XR device state, surrounding environment information, user information, etc. The sensor unit 140*b* may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140*c* may supply power to the XR device 100*a* and include a wired/wireless charging circuit, a battery, etc.

For example, the memory unit 130 of the XR device 100*a* may include information (e.g., data) needed to generate the XR object (e.g., an AR/VR/MR object). The I/O unit 140*a* may receive a command for manipulating the XR device 100*a* from a user and the control unit 120 may drive the XR device 100*a* according to a driving command of a user. For example, when a user desires to watch a film or news through the XR device 100*a*, the control unit 120 transmits content request information to another device (e.g., a hand-held device 100*b*) or a media server through the communication unit 130. The communication unit 130 may download/stream content such as films or news from another device (e.g., the hand-held device 100*b*) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140*a*/sensor unit 140*b*.

The XR device 100*a* may be wirelessly connected to the hand-held device 100*b* through the communication unit 110 and the operation of the XR device 100*a* may be controlled by the hand-held device 100*b*. For example, the hand-held device 100*b* may operate as a controller of the XR device 100*a*. To this end, the XR device 100*a* may obtain information about a 3D position of the hand-held device 100*b* and generate and output an XR object corresponding to the hand-held device 100*b*.

Examples of a Robot Applicable to the Present Disclosure

Figure 26:
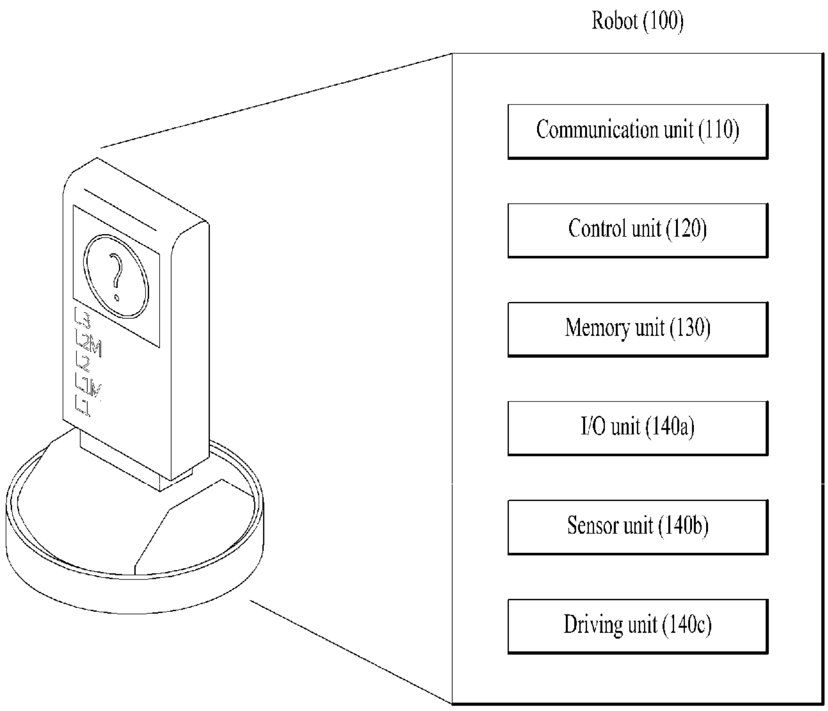

FIG. 26 illustrates a robot applied to the present disclosure. The robot may be categorized into an industrial robot, a medical robot, a household robot, a military robot, etc., according to a used purpose or field.

Referring to FIG. 26, a robot 100 may include a communication unit 110, a control unit 120, a memory unit 130, an I/O unit 140*a*, a sensor unit 140*b*, and a driving unit 140*c*. Herein, the blocks 110 to 130/140*a* to 140*c* correspond to the blocks 110 to 130/140 of FIG. 22, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140*a* may obtain information from the exterior of the robot 100 and output information to the exterior of the robot 100. The I/O unit 140*a* may include a camera, a microphone, a user input unit, a display unit, a speaker, and/or a haptic module. The sensor unit 140*b* may obtain internal information of the robot 100, surrounding environment information, user information, etc. The sensor unit 140*b* may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140*c* may perform various physical operations such as movement of robot joints. In addition, the driving unit 140*c* may cause the robot 100 to travel on the road or to fly. The driving unit 140*c* may include an actuator, a motor, a wheel, a brake, a propeller, etc.

Example of AI Device to which the Present Disclosure is Applied.

Figure 27:
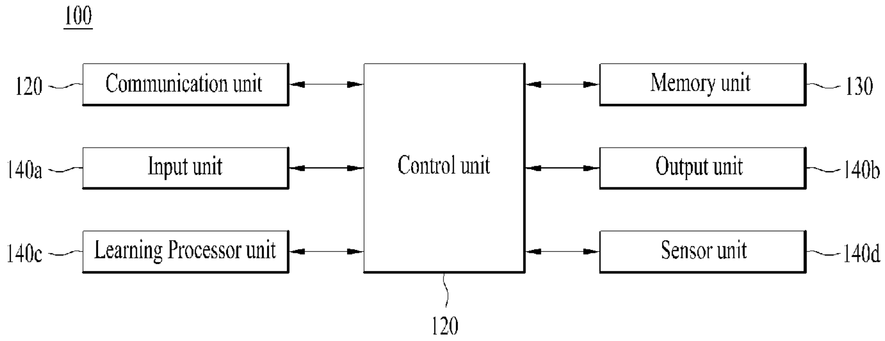

FIG. 27 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 27, an AI device 100 may include a communication unit 110, a control unit 120, a memory unit 130, an I/O unit 140*a*/140*b*, a learning processor unit 140*c*, and a sensor unit 140*d*. The blocks 110 to 130/140*a* to 140*d* correspond to blocks 110 to 130/140 of FIG. 22, respectively.

The communication unit 110 may transmit and receive wired/radio signals (e.g., sensor information, user input, learning models, or control signals) to and from external devices such as other AI devices (e.g., 100*x*, 200, or 400 of FIG. 21) or an AI server (e.g., 400 of FIG. 21) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140*c* or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140*c* or transmit the collected information to an external device such as an AI server (400 of FIG. 21). The collected history information may be used to update a learning model.

The memory unit 130 may store data for supporting various functions of the AI device 100. For example, the memory unit 130 may store data obtained from the input unit 140*a*, data obtained from the communication unit 110, output data of the learning processor unit 140*c*, and data obtained from the sensor unit 140. The memory unit 130 may store control information and/or software code needed to operate/drive the control unit 120.

The input unit 140*a* may acquire various types of data from the exterior of the AI device 100. For example, the input unit 140*a* may acquire learning data for model learning, and input data to which the learning model is to be applied. The input unit 140*a* may include a camera, a microphone, and/or a user input unit. The output unit 140*b* may generate output related to a visual, auditory, or tactile sense. The output unit 140*b* may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140*c* may learn a model consisting of artificial neural networks, using learning data. The learning processor unit 140*c* may perform AI processing together with the learning processor unit of the AI server (400 of FIG. 21). The learning processor unit 140*c* may process information received from an external device through the communication unit 110 and/or information stored in the memory unit 130. In addition, an output value of the learning processor unit 140*c* may be transmitted to the external device through the communication unit 110 and may be stored in the memory unit 130.

The above-described embodiments of the present disclosure are applicable to various mobile communication systems.

The invention claimed is:

1. An operating method of an intelligent transport systems (ITS)-related apparatus related to a vulnerable road user (VRU) in a wireless communication system, the operating method comprising:

receiving a report related to a VRU awareness message (VAM);

determining, based on the report, a situation in which the VAM transceiver is located in a dangerous area but the VRU of the VAM transceiver does not possess the VAM transceiver; and transmitting, based on the situation, a message for the VAM transceiver to enter a temporarily invalid (TI) state to prevent a false alarm from occurring around the VAM transceiver and for preventing revocation of a certificate of the VAM transceiver, wherein the TI state is released based on the VRU possessing the VAM transceiver again.

2. The operating method of claim 1, wherein, in the TI state, the VAM of the VAM transceiver is excluded from a VRU protection-related procedure of the ITS-related apparatus.

3. The operating method of claim 1, wherein the situation is determined based on a predetermined detection evidence level, and the predetermined detection evidence level is one of reception of the report, additional reception of the VAM from the same VAM transceiver, reception of the VAM from a neighboring device of the VAM transceiver, reception of the VAM from the neighboring device of the VAM transceiver and reception of sensor information, and reception of the VAM from the neighboring device of the VAM transceiver, reception of the sensor information, and reception of a cooperative perception service (CPS) or a decentralized environmental notification (DENM).

4. The operating method of claim 3, wherein the sensor information is one or more of information related to inertia, atmospheric pressure, a path, and a location acquired through a sensor included in the VAM transceiver.

5. An intelligent transport systems (ITS)-related apparatus related to a vulnerable road user (VRU) in a wireless communication system, the ITS-related apparatus comprising:

at least one processor; and at least one computer memory operably connected to the at least one processor and storing instructions that, when executed, cause the at least one processor to perform operations, wherein the operations comprise:

receiving a report related to a VRU awareness message (VAM);

determining, based on the report, a situation in which the VAM transceiver is located in a dangerous area but the VRU of the VAM transceiver does not possess the VAM transceiver; and transmitting, based on the situation, a message for the VAM transceiver to enter a temporarily invalid (TI) state to prevent a false alarm from occurring around the VAM transceiver and for preventing revocation of a certificate of the VAM transceiver, wherein the TI state is released based on the VRU possessing the VAM transceiver again.

6. The ITS-related apparatus of claim 5, wherein, in the TI state, the VAM of the VAM transceiver is excluded from a VRU protection-related procedure of the ITS-related apparatus.

7. An operating method of a vulnerable road user (VRU) awareness message (VAM) transceiver related to a VRU in a wireless communication system, the operating method comprising:

transmitting a report related to a VAM, wherein the report includes information related to a situation in which the VAM transceiver is located in a dangerous area but the VRU of the VAM transceiver does not possess the VAM transceiver;

receiving, based on the report, a message for the VAM transceiver to enter a temporarily invalid (TI) state to prevent a false alarm from occurring around the VAM transceiver and for preventing revocation of a certificate of the VAM transceiver;

entering, based on the message, the TI state without the revocation; and releasing the TI state based on the VRU possessing the VAM transceiver again.

8. A vulnerable road user (VRU) awareness message (VAM) transceiver related to a VRU in a wireless communication system, the VAM transceiver comprising:

at least one processor; and at least one computer memory operably connected to the at least one processor and storing instructions that, when executed, cause the at least one processor to perform operations, wherein the operations comprise:

transmitting a report related to a VAM, wherein the report includes information related to a situation in which the VAM transceiver is located in a dangerous area but the VRU of the VAM transceiver does not possess the VAM transceiver;

receiving, based on the report, a message for the VAM transceiver to enter a temporarily invalid (TI) state to prevent a false alarm from occurring around the VAM transceiver and for preventing revocation of a certificate of the VAM transceiver;

entering, based on the message, the TI state without the revocation; and releasing the TI state based on the VRU possessing the VAM transceiver again.

* * * * *